(12) United States Patent
Okuda et al.

(10) Patent No.: US 6,183,869 B1
(45) Date of Patent: Feb. 6, 2001

(54) PRIMER COMPOSITION, FIXING MEMBER, AND FIXING DEVICE USING THE FIXING MEMBER

(75) Inventors: Daisuke Okuda; Yoshio Shoji, both of Minami-Ashigara (JP)

(73) Assignee: Fuji Xerox Co., Ltd., Tokyo (JP)

( * ) Notice: Under 35 U.S.C. 154(b), the term of this patent shall be extended for 0 days.

(21) Appl. No.: 09/069,177

(22) Filed: Apr. 29, 1998

(30) Foreign Application Priority Data

| May 2, 1997 | (JP) | 9-114651 |
| Jun. 9, 1997 | (JP) | 9-151428 |
| Jun. 9, 1997 | (JP) | 9-151431 |

(51) Int. Cl.[7] .............. B32B 27/08; B32B 27/30; B32B 27/34
(52) U.S. Cl. .............. 428/411.1; 428/421; 428/422; 428/448; 428/450; 428/451; 428/473.5; 428/474.4
(58) Field of Search .................... 428/421, 422, 428/473.5, 411.1, 474.4, 448, 450, 451; 525/180, 189

(56) References Cited

U.S. PATENT DOCUMENTS

| 3,801,379 | 4/1974 | Blackwell | 148/275 |
| 4,049,863 | 9/1977 | Vassiliou | 428/324 |
| 4,139,576 | * 2/1979 | Yoshimura et al. | 525/179 |
| 5,824,416 | * 10/1998 | Chen et al. | 428/422 |
| 5,985,983 | * 11/1999 | Yamada et al. | 524/520 |

FOREIGN PATENT DOCUMENTS

| 57-177067 | 10/1982 | (JP) . |
| 61-250668 | 11/1986 | (JP) . |
| 63-112674 | 5/1988 | (JP) . |
| 64-1534 | 1/1989 | (JP) . |
| 1-155378 | 6/1989 | (JP) . |
| 2-150875 | 6/1990 | (JP) . |
| 2-150876 | 6/1990 | (JP) . |
| 4-8543 | 1/1992 | (JP) . |
| 4-45931 | 2/1992 | (JP) . |
| 4-78533 | 3/1992 | (JP) . |

OTHER PUBLICATIONS

Encyclopedia of Polymer Science and Engineering, John Wiley & Sons, vol. 1 p. 497–498.*

* cited by examiner

*Primary Examiner*—Paul Thibodeau
*Assistant Examiner*—Ramsey Zacharia
(74) *Attorney, Agent, or Firm*—Oliff & Berridge, PLC

(57) ABSTRACT

A primer composition for a fluororesin comprises a heat resistant resin, a fluororesin and a coupling agent, or a fluororesin and a silicone-modified polyimide, or a fluorine-containing polyimide resin. On the surface of a substrate, a primer layer is formed using any of these primer compositions for a fluororesin, and a fluororesin layer is formed via this primer layer, to produce a fixing member.

15 Claims, 4 Drawing Sheets

FIG. 3A
FIG. 3B
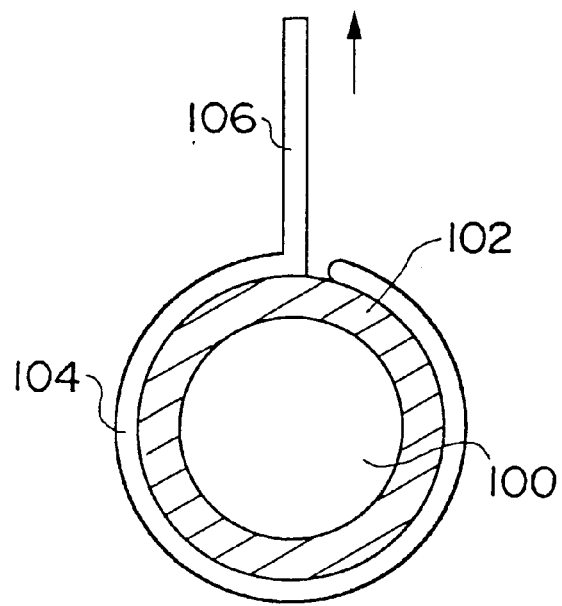
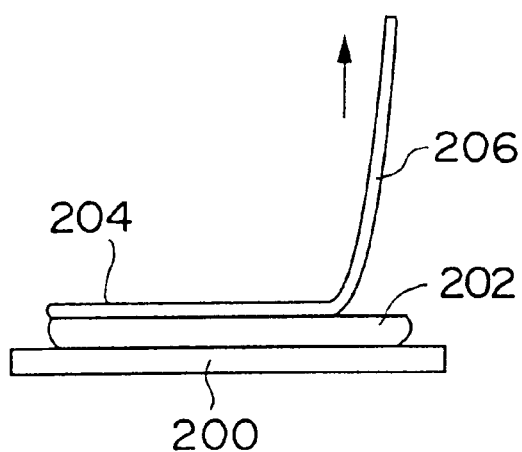

PRIMER COMPOSITION, FIXING MEMBER, AND FIXING DEVICE USING THE FIXING MEMBER

BACKGROUND OF THE INVENTION

1. Field of the Invention

The present invention relates to a fixing member such as a heat roll, belt and the like used in a fixing portion and the like of a copying apparatus, printer, and other various image forming apparatuses used in an electrophotography method in which the member is always exposed to heating and cooling cycles and mechanical press-contacting, a primer composition suitably used for such a fixing member, and a fixing device using such a fixing member.

2. Description of the Related Art

As a method for fixing a toner image formed on paper in a copying apparatus, a printer, and other various image forming apparatuses used in an electrophotography method, there is usually adopted a method in which a supporting substrate such as paper and the like on which a toner image is formed is passed between two rotating members which are heated by a heat generating body such as a lamp and the like placed thereabout and press-contacted with each other, to fuse the toner image on the supporting substrate.

As one example of the fixing device used in such a method, a heat roll fixing device as shown in FIG. 1 is listed, and this heat roll fixing device is composed of a pair of rolls being a heat roll 1 and a pressure roll 11. The heat roll 1 comprises hollow core metal 2 in the form of a cylinder composed of aluminum, iron, and the like having a surface coated with a fluororesin layer 4 composed of a heat resistant elastomer or heat resistant resin having excellent releasing properties such as a fluorine-based resin such as fluororubber, silicone rubber, polytetrafluoroethylene (PTFE), a copolymer of tetrafluoroethylene with perfluoroalkylvinyl ether (PFA), and the like. Further, inside the heat roll 1, a heat generating body 21 such as a halogen lamp and the like is placed to impart a heat roll function to the roll 1.

On the other hand, the pressure roll 11 comprises hollow core metal 12 in the form of a cylinder composed of aluminum, iron, and the like having a surface coated with a fluororesin layer 14 composed of a heat resistant elastomer or heat resistant resin having excellent releasing properties of the same kind or of a different kind from those used for the heat roll 1. The heat roll 1 and the pressure roll 11 are press-contacted with each other by a spring and the like. In FIG. 1, 27 indicates an inlet, 28 indicates an outlet, and 29 indicates a releasing agent application apparatus which applies a releasing agent to the surface of the heat roll 1.

In this heat roll fixing device, paper 31 carrying a toner image 32 on the surface is conveyed between the heat roll 1 and the pressure roll 11, and the toner image 32 is fixed on the paper 31, then, the paper 31 is conveyed by a pair of rolls through the outlet 28.

The fixing member coated on the surface of a substrate such as a roll and the like is required not to cause a hot offset phenomenon in which a part of a fused toner image adheres to the rotating member, and the phenomenon in which a toner image does not separate from the rotating member and is curled onto the rotating member together with the substrate.

On the other hand, since a heating and cooling cycle is repeated in which the fixing member is heated to temperatures as high as 200° C. as the setting temperature when the apparatus is operating and cooled down to room temperature when the operation is terminated, the fixing member is also required to be able to tolerate this cycle. Further, on the outermost surface of the rotating member, the fixing members installed facing each other are press-contacted against each other, and the fixing member is placed under severe stress from a stripping finger for preventing paper curl which is always press-contacted with the member, and the like.

Therefore, the heat resistant elastomer or heat resistant resin having excellent releasing properties coated on a rotating member of a fixing apparatus is limited to silicone-based or fluorine-based polymer materials such as fluororubber, silicone rubber, fluororesin, and the like. Unfortunately, although these polymer materials have excellent releasing properties, their adhesion to a substrate such as metal and the like is poor, therefore, it is difficult to coat them directly as a surface layer in producing a heat roller.

Hence, as a method for coating a fluororesin having low adhesion on the surface of a substrate, there is suggested a method in which an adhesive member called primer is inserted between the fluororesin layer and the metal surface.

For example, regarding a case in which a PFA resin is used as a fluororesin, Japanese Patent Application Laid-Open (JP-A) No. 57-177067 suggests a method in which hollow core metal and a PFA resin layer are adhered via an adhesive primer containing a PFA resin and a polyimide precursor obtained by reaction of pyromellitic anhydride with diaminodiphenyl ether, diaminodiphenylmethane, and the like. Japanese Patent Application Laid-Open (JP-A) No. 63-112674 suggests a method in which hollow core metal and a PFA resin are adhered by an adhesive primer containing in a mixed solvent of a water-soluble organic solvent with water, a PFA resin and a material obtained by neutralizing with amine an aromatic polyimide precursor or free carboxylic acid thereof prepared by reacting pyromellitic anhydride with 4,4'-diaminodiphenylsulfone, as main components.

Further, regarding a case in which a PTFE resin is used instead of a PFA resin as a fluororesin, U.S. Pat. No. 4,049,863 describes a primer containing PTFE, colloidal silica, and polyamideimide (PAI) in which the ratio of PTFE to PAI is 1:9, and suggests coating this primer on a metal core roll which has been surface-treated by grid blasting, flame fusing or frit coating with metal or metal oxide, or phosphoric acid, chromic acid or the like, so as to obtain a dry film thickness of 2 to 15 $\mu$m. U.S. Pat. No. 3,801,379 suggests coating poly(arylene sulfide) containing 5 to 20% PTFE on an aluminum substrate after treatment of the surface of a core roll with hot water or vapor. Canadian Patent No. 887,122 suggests conducting coating in gradated structure conditionusing PAI and PTFE. Further, U.K. Patent No. 1,512,495 suggests that in PAI coating containing a PTFE powder, the minimum ratio of PTFE to PAI is 1:7.

Particularly, in fixing members used in an image forming apparatus in electrophotography mode, as an example of a fixing member obtained by adhering a fluororesin layer to a substrate such as metal and the like by a primer, Japanese Patent Application Laid-Open (JP-A) No. 64-1534 suggests a fluororesin-coated cylindrical member obtained by heat-fusing a heat-flowable fluororesin tube containing a filler onto a cylindrical member whose surface has been treated previously with a primer containing a fluororesin. Japanese Patent Application Laid-Open (JP-A) Nos. 4-8543, 4-45931 and 4-78533 suggest a fluororesin-coated cylindrical member obtained by heat-fusing a fluororesin tube onto a cylindrical member having a primer layer containing a polyparabanic acid resin or polyimide resin.

These primers contain as the main component a heat resistant resin such as a polyamide, polyimide, polyamideimide, polyarylene sulfide, and the like and have the drawbacks that when a substrate and a fluororesin are adhered using the above-described adhesive primer or in the case of a fixing member obtained by adhering a fluororesin layer to a substrate such as metal and the like by a primer, adhesion between the fluororesin layer and the substrate such as metal and the like exhibits excellent results in the initial stages, however, under the severe conditions of use for a fixing member used in an electrophotographic type image forming apparatus, deterioration with age occurs and the fluororesin peels easily off the substrate, and therefore the life span thereof is not long.

SUMMARY OF THE INVENTION

The present invention has been accomplished in view of the above-described problems, and the object thereof is to provide a fixing member in which a primer layer is provided between a substrate and a fluororesin layer having excellent heat resistance and adhesion with the substrate and also with the fluororesin layer and, even under the severe conditions described above, the fluororesin layer does not easily peel off the substrate, particularly a metal substrate and has excellent durability, the fixing member being used in an electrophotographic type image forming apparatus, and a primer composition suitably used in this fixing member. Another object of the present invention is to provide a fixing apparatus using the fixing member having these excellent properties.

The present inventors after studying a material composition containing a composition which is covalent-bonded with a hydroxyl group on the surface of a substrate, completed the present invention.

The first primer composition of the present invention is a primer composition for a fluororesin containing a heat resistant resin, fluororesin, and a coupling agent. This primer composition can be applied widely in various fixing members used under severe conditions, and exhibits excellent adhesion between a metal substrate and a fluororesin layer in a fixing member.

One of the fixing members of the present invention is a fixing member obtained by forming a fluororesin layer via a primer layer on the surface of a substrate wherein the primer layer is made from the first primer composition comprising a heat resistant resin, fluororesin, and coupling agent.

In the fixing member using the first primer composition of the present invention, adhesion between a fluororesin layer, having releasing properties and a metal substrate in particular, is excellent as compared with conventional articles, and even under severe conditions, this adhesion does not noticeably deteriorate with age and the fluororesin does not peal off the metal substrate for a long period of time. This primer composition used in the heating member has excellent adhesion between the metal substrate and the fluororesin and durability thereof, and can be widely used for improving adhesion between a metal substrate and a fluororesin in a heating member.

The second primer composition of the present invention is a primer composition for a fluororesin comprising a fluororesin and a silicone-modified polyimide.

One of the fixing members of the present invention is a fixing member obtained by forming a fluororesin layer via a primer layer on the surface of a substrate wherein the primer layer is made from the second primer composition comprising a fluororesin and a silicone-modified polyimide.

It is hypothesized that in the fixing member using the second primer composition of the present invention, adhesion of the metal to the fluororesin is improved and heat resistance, heat cycle resistance, stress resistance, and the like are excellent, as compared with conventional fixing members since the primer layer according to the present invention is composed of fluororesin and silicone-modified polyimide having excellent adhesion to metal so that when the fluororesin of the fluororesin layer is heat-fused, this fluororesin is compatibilized with the fluororesin in the primer layer to form an gradated structure at the boundary surface of the fluororesin layer with the primer layer.

The fixing member using the second primer composition of the present invention has a primer layer having remarkably improved adhesion to inorganic materials such as metal in particular as compared with conventional primer layers, and has excellent heat resistance, heat cycle resistance, stress resistance, and the like. Therefore, in the fixing member of the present invention, deterioration of the primer layer with age does not readily occur even under the severe conditions of the member being normally exposed to heating and cooling cycles and mechanical stress, and the fluororesin does not peel away from the substrate such as metal and the like for a long period of time, therefore, the life of the fixing member is greatly lengthened as compared with conventional fixing members, and it becomes possible to improve reliability and to lower running costs.

The third primer composition of the present invention is a primer composition for a fluororesin comprising a fluorine-containing polyimide resin.

One of the fixing members of the present invention is a fixing member obtained by forming a fluororesin layer via a primer layer on the surface of a substrate wherein the primer layer is made from the third primer composition for a fluororesin comprising a fluorine-containing polyimide resin.

The fixing member using the third primer composition of the present invention has a primer layer having remarkably improved adhesion to inorganic materials such as metal, in particular, as compared with conventional primer layers, and has excellent heat resistance, heat cycle resistance, stress resistance, and the like. Therefore, in the fixing member of the present invention, the primer layer does not readily deteriorate with age even under the severe conditions of the primer layer being normally exposed to heating and cooling cycles and mechanical stress, and the fluororesin does not peel away from the metal for a long period of time, therefore, the life of the fixing member is greatly lengthened as compared with conventional fixing members, and it becomes possible to improve reliability and to lower running costs.

It is hypothesized that in the fixing member using the third primer composition of the present invention, adhesion of the metal to the fluororesin is improved and heat resistance, heat cycle resistance, stress resistance, and the like are excellent as compared with conventional fixing members since the primer layer according to the present invention is composed of a fluorine-containing polyimide so that when the fluororesin of the fluororesin layer is heat-fused, this fluororesin is compatibilized with the fluorine-containing polyimide to improve adhesion between the primer and the fluororesin.

Therefore, according to the fixing member using the third primer composition of the present invention, there is provided a fixing member in which deterioration with age and peeling of the fluororesin from the metal do not occur for a long period of time even under the severe conditions of the member being normally exposed to heating and cooling cycles and mechanical stress, and durability is excellent as compared with conventional fluororesin-coated fixingmembers usingaprimer, the fixing member being used in an electrophotographic type image forming apparatus.

BRIEF DESCRIPTION OF THE DRAWINGS

FIG. 2A is a view showing a metal substrate, i.e. a mirror-processed aluminum plate 70. FIG. 2B is a view showing a state in which a primer layer 72 is formed on the substrate. FIG. 2C is a view showing a state in which a cellophane tape 74 is affixed to the primer layer 72.

FIGS. 3A and 3B are views showing an outline of a peeling strength test for evaluating the adhesion strength of a PFA resin adhered to a substrate via primer layer. FIG. 3A is a view showing an outline of a peeling strength test when the object tested is a heat roll. FIG. 3B is a view showing an outline of a peeling strength test when the object tested is a heat belt.

DETAILED DESCRIPTION OF THE INVENTION

Figure 1:
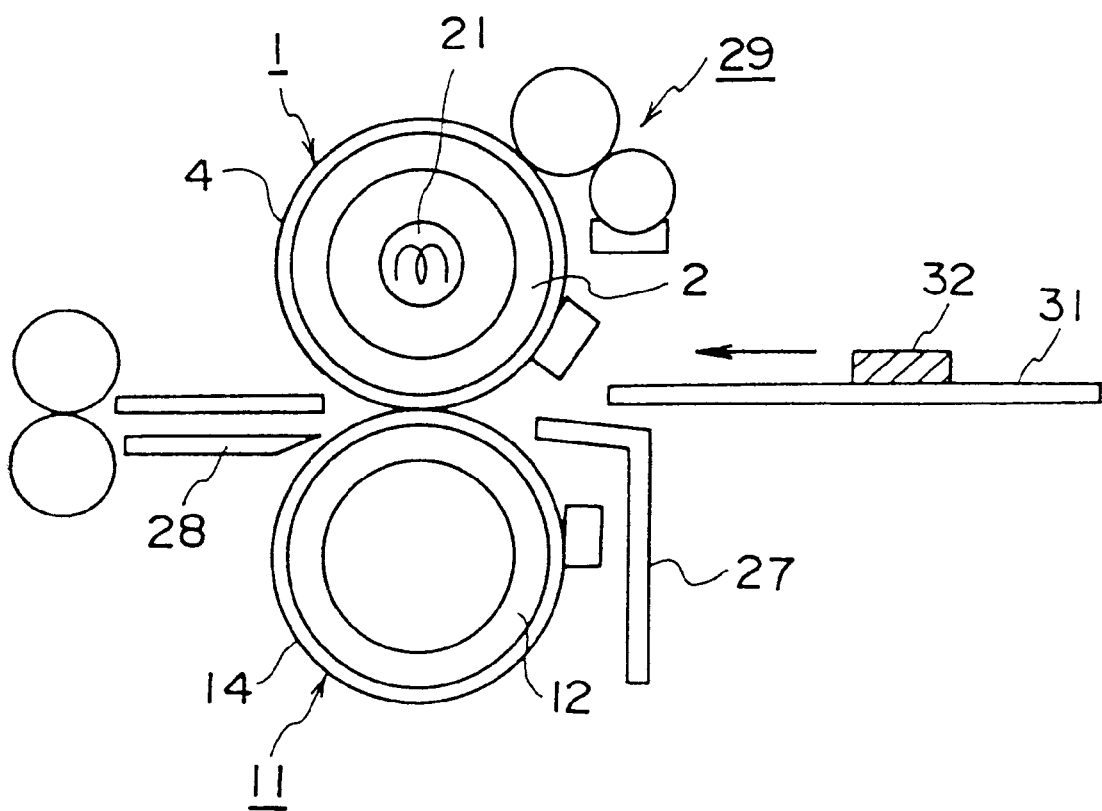
FIG. 1 is a schematic sectional view showing an example of a conventional heat roller type fixing apparatus.

The present invention will be described in detail below.

The fixing member of the present invention is a fixing member obtained by forming a fluororesin layer on the surface of a substrate via a primer layer, and the primer layer is made from the primer composition of the present invention.

(Substrate)

The substrate used in the present invention may be a substrate composed of an inorganic material, or may be a substrate composed of a heat resistant resin containing an inorganic material as a filler. Examples of the inorganic material include metal such as aluminum, copper, nickel, and the like, alloys such as stainless alloy, silver alloy, nickel alloy, and the like, or ceramics and the like, having excellent heat conductivity. Examples of the heat resistant resin containing an inorganic material as a filler include metal, inorganic oxides such as $SiO_2$, $TiO_2$, $Al_2O_3$, MgO, CaO, $Fe_2O_3$ and the like, heat resistant resins such as a polyamide, polyamideimide, polyimide, polyarylene sulfide, polyether, and the like to which a fine particle of Sic (silicon carbide) or BN (boron nitride) is added.

When an inorganic material is added to the heat resistant resin as a filler, the content of the inorganic material which is a filler in the substrate is preferably from 0.1% by weight to 50% by weight, and more preferably from 1% by weight to 30% by weight. The average particle size of the inorganic material is desirably set at not more than 5 $\mu$m. When the average particle size is over 5 $\mu$m, there is the concern that the inorganic material will tend to fallout from the heat resistant resin. Further, in view of dispersibility, the inorganic material having an average particle size of 0.001 $\mu$m or more is more preferable.

When the substrate is composed of an inorganic material such as metal and the like, the substrate is provided in the form of a roll of a hollow core metal and the like or a belt of a Ni electrocast sheet and the like, and when the substrate is composed of a heat resistant resin to which an inorganic material is added, the substrate is provided in the form of a belt of, for example, a polyimide film and the like, however, the substrate is not limited to these forms.

It is preferable to conduct a surface treatment of the substrate to firmly adhere the primer layer on the surface of the substrate using the primer composition of the present invention. For example, in the case of a metal substrate, it is preferable to conduct a de-greasing and washing treatment using an organic solvent and the like and a surface roughing treatment, and it is more preferable to conduct the surface roughing treatment after the surface cleaning treatment such as de-greasing and washing and the like has been conducted. This surface roughing treatment can be conducted by a known method such as sandblasting, chemical etching, and the like.

(Primer Layer)

Next, the primer layer will be explained.

The fixing member of the present invention can be made into three kinds of fixing members by changing the primer composition forming the primer layer to the first primer composition, second primer composition, and third primer composition.

(First Primer Composition)

The first primer composition of the present invention is a composition comprising at least a fluororesin, coupling agent, and heat resistant resin. More specifically, this primer composition comprises as an essential component a silane coupling agent containing Si in the molecule, heat resistant resin or precursor thereof, and fluororesin.

It is preferable that the first primer composition of the present invention is a two-part type primer composition composed of a first solution containing as a main component a silane coupling agent and a second solution containing a fluororesin and heat resistant resin.

(Silane Coupling Agent)

As the coupling agent in the present invention, a coupling agent composed of an inorganic material such as a Ti, Al, or Zn-based compound and the like can also be used, however, when the substrate is made from an inorganic material, silane coupling agents having Si are preferred in order to firmly adhere the fluororesin layer composed of an organic material to the substrate composed of an inorganic material, and among them, a silane coupling agent represented by the following general formula (1) is particularly preferred.

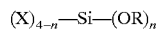  General formula (1)

(wherein, R represents a methyl group or ethyl group, X represents a monovalent organic group which may contain a vinyl group, epoxy group, methacryl group, mercapto group, amino group, ethoxy group, and methyl group, and n is an integer from 2 to 4.) is particularly preferred.

Among these, the coupling agents having the best heat resistance are tetramethoxysilane and tetraethoxysilane in which four ethoxy groups or methoxy groups are aligned. It is believed that these compounds further improve heat resistance since the compounds do not leave an organic residue when the coupling reaction is conducted.

A coupling agent has two or more different reactive groups in the molecule and works by chemically bonding an organic material to an inorganic material. The mechanism of this adhesion will be described regarding the silane coupling agent represented by the general formula (1) as follows: An alkoxysilyl group (Si—OR) in the silane coupling agent is hydrolyzed either by water or moisture to be a silanol group (Si—OH). This silanol group and a hydroxyl group on the surface of the inorganic material form a Si—O—M bond by a dehydration condensation reaction. Further, one reactive group (—X) can be bonded to or compatibilized with the organic material and consequently can be bonded to both the organic material and the inorganic material.

The aim of using the coupling agent is to observe the difference in the size of the bonding energy, and the point thereof is to use strong covalent bonding energy and not to effect adhesionbypartial covalent bonding or hydrogenbonding, or by a weak bonding force such as van der Waals force and the like, as is the case with conventional primers.

(Heat Resistant Resin)

As the heat resistant resin which can be used in the first primer composition of the present invention, any heat resistant resin having a continuous use temperature of 180° C. or more can be used, and in view of their effectiveness, aromatic heat resistant resins such as apolyimide, polyamideimide, polyether sulfone, polyphenylene sulfide, and the like are listed as preferable examples. The polyimide is generally obtained by reacting tetracarboxylic dianhydride with a diamine in an organic polar solvent.

In the present invention, the same effect is obtained when instead of the heat resistant resin, a precursor thereof is used, therefore, when a resin is referred to as a heat resistant resin in the present invention, that resin may also be a precursor thereof.

For example, in the primer layer constituting the fixing member of the present invention, a polyimide or precursor thereof (polyamic acid) can be used as the heat resistant resin. The polyamideimide is a polymer having a structure containing an amide group and an imide group alternately, and can be produced usually from an aromatic tricarboxylic anhydride and an aromatic diamine. According to the acid chloride method, a precursor polyamic acid is obtained, and when this is dehydrated and ring-closed, it becomes a polyamideimide, and according to the isocyanate method or direct polycondensation method, a polyamideimide can be obtained in one step. In the present invention, apolyamideimde or precursor thereof is used. The polyether sulfone (PES) is a type of an aromatic polycondensation type polymer generally obtained by a condensation reaction using dichlorodiphenyl sulfone as the main raw material. The polyphenylene sulfide (PPS) is a type of an aromatic polymer having a melting point of 283° C. and a continuous use temperature of 200 to 220° C.

(Fluororesin)

As the fluororesin which is the third essential component of the first primer composition of the present invention, a resin having excellent heat resistance is preferred for enabling continuous use at 200° C. or more by heating the fixing member, and examples thereof include PTFE, PFA, tetrafluoroethylene-hexafluoropropylene copolymer (FEP) and the like. Among them, PFA is particularly preferred in view of its resistance to mechanical stress and excellent processability.

This fluororesin is prepared in the form of a powder or an aqueous dispersed material called a dispersion and compounded in the primer. The fluororesin in the primer is melted by heat applied when the fluororesin layer is formed and compatibilizes the fluororesin in the fluororesin layer. It is compounded for the purpose of firmly adhering the fluororesin to the primer by forming an gradated structure in the concentration of the fluororesin at the boundary surface between the fluororesin layer and the primer layer.

(Other Additives)

In the primer composition, in addition to the essential components and a solvent for dissolving them, various additives can be used together for improving properties and conditions in the range which is not harmful to the effects of the present invention. For example, a surfactant such as polyoxyethylenephenyl ether and the like may be added for improving dispersibility of the fluororesin in the primer solution.

(Formation of Primer Layer)

A method for forming a primer layer of a fixing member using the first primer composition of the present invention will be described.

In general, there are largely two methods for adding a silane coupling agent to the primer layer. One of them is called the integral blend method in which when a resin layer is adhered to an inorganic material, a mixture, prepared by mixing the silane coupling agent together with other materials of the primer composition, is applied to the surface of the inorganic material, and can be easily integrated into the production process and has excellent workability. However, in this method, the amount used of the silane coupling agent increases since this method can not easily match the effects of direct treatment on the surface of the inorganic material. The other method is called a pre-treatment method in which a substrate formed from inorganic material is previously surface-treated with a treating agent containing, as a main agent, a silane coupling agent, and can easily match the effects of the silane coupling agent, and when the treatment is conducted in wet mode, treatment efficiency is high and uniform treatment can be effected, therefore, this method is industrially widely used.

When the primer layer of the fixing member of the present invention is formed, it is preferred to add a silane coupling agent by a wet pre-treatment method in which strong adhesive strength is obtained with a smaller amount of primer composition, and the primer composition used in this method is preferably a two-part type composition composed of a first solution containing as a main component a silane coupling agent and a second solution containing a fluororesin and heat resistant resin, being coated sequentially.

When a primer layer is formed using asilane coupling agent by the integral blend method, the primer layer is formed by coating on the surface of a substrate an adhesive primer solution prepared by dissolving the above-described heat resistant resin or precursor thereof and the above-described fluororesin and silane coupling agent together into a water-soluble organic solvent such as N-methyl-2-pyrrolidone, furfuryl alcohol, butanol, isopropanol, ethanol, and the like. In this case, the amount of the silane coupling agent to be added and mixed is preferably from 1% by weight to 20% by weight based on the primer solution, and more preferably from 1% by weight to 10% by weight.

Further, when a primer layer is formed using a silane coupling agent by the wet pre-treatment method, the primer layer is formed by applying a first solution containing as a main agent a silane coupling agent to the surface of a substrate, then, applying to the surface of the substrate, on which the first solution has been coated and dried, a second solution prepared by dissolving the above-described heat resistant resin or precursor thereof and the fluororesin together in a water-soluble organic solvent. In this case, as the first solution, it is preferable to dilute the silane coupling agent with a solvent to be a concentration from 1 to 20% by weight for use. As the solvent used in this case, almost all organic solvents such as alcohols, toluene, xylene, ethyl acetate, methylethylketone, acetone or a mixed solvent of alcohol with water, and the like, can be applied. Further, after applying the first solution, it is preferable to remove the solvent by air drying, then, to conduct heat treatment at a temperature in the range of from 100 to 200° C. to increase the strength of the primer layer.

In any case, the ratio after mixing of the above-described heat resistant resin or precursor thereof to the fluororesin is in the range of from 10:90 to 90:10, and preferably from 30:70 to 70:30 by weight.

As a method for coating the primer solution, a dipping method, spin method, spray method, roll coat method, and the like can be used, and the dipping method and spray method are preferred, and the film thickness of the primer layer after drying is from 1 to 50 μm, and preferably 3 to 20 μm. The drying can be conducted by heating or air drying.

(Second Primer Composition)

The second primer composition of the present invention comprises a fluororesin and silicone-modified polyimide.

(Fluororesin)

As the fluororesin used in the second primer composition of the present invention, a resin having excellent heat resistance is preferred for enabling continuous use at 200° C. or more by heating the fixing member, and examples thereof include PTFE, PFA, tetrafluoroethylene-hexafluoropropylene copolymer (FEP) and the like. Among these, PFA is particularly preferred in view of its resistance to mechanical stress and its excellent processability.

This fluororesin is prepared in the form of a powder or an aqueous dispersed material called a dispersion, and compounded in the primer. The fluororesin in the primer is melted by heat applied when the fluororesin layer is formed and compatibilizes the fluororesin in the fluororesin layer. It is compounded for the purpose of firmly adhering the fluororesin to the primer by forming an inclined structure in the concentration of the fluororesin at the boundary surface between the fluororesin layer and the primer layer.

(Silicone-modified Polyimide)

As the silicone-modified polyimide used in the second primer composition of the present invention, a polyimide is preferred which is obtained by reacting as a monomer at least one of a tetracarboxylic dianhydride represented by the following general formula (2) containing a polysiloxane unit and a diamine represented by the following general formula (3) containing a polysiloxane unit.

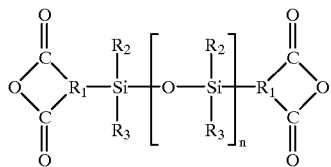

General formula (2)

(wherein, $R_1$ represents a trivalent aliphatic group or aromatic group, and the acid anhydride skeleton is a 5-membered or 6-membered ring, and the number of carbon atoms is from 6 to 50. $R_2$ and $R_3$ may be different from each other and represent a monovalent aliphatic group or aromatic group. n is an integer from 1 to 100.)

Specifically, examples of $R_2$ and $R_3$ include aliphatic groups such as a methyl group, ethyl group, propyl group, n-butyl group, iso-butyl group, tert-butyl group, and the like and aromatic groups such as a phenyl group and the like, and the methyl group, ethyl group and phenyl group are preferred. In view of adhesion and heat resistance to a substrate, n is preferably an integer from 1 to 10.

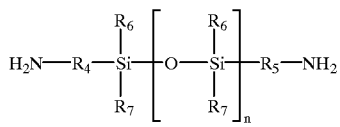

General formula (3)

(wherein, $R_4$ and $R_5$ maybe different from each other and represent a divalent aliphatic group having 1 to 10 carbon atoms or an aromatic group having 6 to 50 carbon atoms. $R_6$ and $R_7$ may be different from each other and represent a monovalent aliphatic group or aromatic group. n is an integer from 1 to 100.)

Specifically, examples of $R_4$ and $R_5$ include a methylene group, ethylene group, and phenylene group and in view of its heat resistance, the phenylene group is preferred. Examples of $R_6$ and $R_7$ include aliphatic groups such as a methyl group, ethyl group, propyl group, n-butyl group, iso-butyl group, tert-butyl group, and the like and aromatic groups such as a phenyl group and the like, and the methyl group, ethyl group, and phenyl group are preferred. In view of adhesion and heat resistance to a substrate, n is preferably an integer from 1 to 10.

As a combination of monomer components, there are a combination of a tetracarboxylic dianhydride represented by the general formula (2) with other diamines, a combination of a diamine represented by the general formula (3) with other tetracarboxylic dianhydrides, and a combination of a tetracarboxylic dianhydride represented by the general formula (2) with a diamine represented by the general formula (3).

Examples of other tetracarboxylic anhydrides include, but are not limited to, pyromellitic dianhydride, 3,3',4,4'-benzophenonetetracarboxylic anhydrides, 2,2',3,3'-benzophenonetetracarboxylic anhydrides, 2,3,3',4-benzophenonetetracarboxylic anhydrides, naphthalene-2,3,6,7-tetracarboxylic anhydrides, naphthalene-1,2,5,6-tetracarboxylic anhydrides, naphthalene-1,2,4,5-tetracarboxylic anhydrides, naphthalene-1,4,5,8-tetracarboxylic anhydrides, naphthalene-1,2,6,7-tetracarboxylic anhydrides, 4,8-dimethyl-1,2,3,5,6,7-hexahydronaphthalene-1,2,5,6-tetracarboxylic anhydrides, 4,8-dimethyl-1,2,3,5,6,7-hexahydronaphthalene-2,3,6,7-tetracarboxylic anhydrides, 2,6-dichloronaphthalene-1,4,5,8-tetracarboxylic anhydrides, 2,7-dichloronaphthalene-1,4,5,8-tetracarboxylic anhydrides, 2,3,6,7-tetrachloronaphthalene-1,4,5,8-tetracarboxylic anhydrides, 1,4,5,8-tetrachloronaphthalene-2,3,6,7-tetracarboxylic anhydrides, 3,3',4,4'-diphenyltetracarboxylic dianhydride, 2,2',3,3'-diphenyltetracarboxylic dianhydride, 2,3,3',4'-diphenyltetracarboxylic dianhydride, 3,3",4,4"-p-terphenyltetracarboxylic dianhydride, 2,2",3,3"-p-terphenyltetracarboxylic dianhydride, 2,3,3",4"-p-terphenyltetracarboxylic dianhydride, 2,2-bis(2,3-dicarboxyphenyl)propane dianhydride, 2,2-bis(3,4-dicarboxyphenyl)propane dianhydride, bis(2,3-dicarboxyphenyl)ether dianhydride, bis(2,3-dicarboxyphenyl)methane dianhydride, bis(3,4-dicarboxyphenyl)methane dianhydride, bis(2,3-dicarboxyphenyl)sulfonic dianhydride, bis(3,4-dicarboxyphenyl)sulfonic dianhydride, 1,1-bis(2,3-dicarboxyphenyl)ethane dianhydride, 1,1-bis(3,4-dicarboxyphenyl)ethane dianhydride, perylene-2,3,8,9-tetracarboxylic dianhydride, perylene-3,4,9,10-tetracarboxylic dianhydride, perylene-4,5,10,11-tetracarboxylic dianhydride, perylene-5,6,11,12- tetracarboxylic dianhydride, phenanthlene-1,2,7,8-tetracarboxylic dianhydride, phenanthlene-1,2,6,7-tetracarboxylic dianhydride, phenanthlene-1,2,9,10-tetracarboxylic dianhydride, cyclopentane-1,2,3,4-tetracarboxylic dianhydride, pyrazine-2,3,5,6-tetracarboxylic dianhydride, pyrrolidine-2,3,4,5-tetracarboxylic dianhydride, thiophene-2,3,4,5-tetracarboxylic dianhydride, 4,4'-oxydiphthalic dianhydride and the like.

Examples of other diamines include, but are not limited to, 3,3'-dimethyl-4,4'-diaminobiphenyl, 4,6-dimethyl-m-phenylenediamine, 2,5-dimethyl-p-phenylenediamine, 2,4-diaminomesitylene, 4,4'-methylenedi-o-toluidine, 4,4'-methylenedi-2,6-xylydine, 4,4'-methylene-2,6-diethylaniline, 2,4-toluenediamine, m-phenylenediamine, p-phenylenediamine, 4,4'-diamino-diphenylpropane, 3,3'-diamino-diphenylpropane, 4,4'-diamino-diphenylethane, 3,3'-diamino-diphenylethane, 4,4'-diamino-diphenylmethane, 3,3'-diamino-diphenylmethane, 4,4'-diamino-diphenylsulfide, 3,3'-diamino-diphenylsulfide, 4,4'-diamino-diphenylsulfone, 3,3'-diamino-diphenylsulfone, 4,4'-diamino-diphenyl ether, 3,3'-diamino-diphenyl ether, benzidine, 3,3'-diaminobiphenyl, 3,3'-dimethoxybenzidine, 4,4"-diamino-p-terphenyl, 3,3"-diamino-p-terphenyl, bis(p-amino-cyclohexyl)methane, bis(p-β-amino-t-butylphenyl) ether, bis(p-β-methyl-δ-aminopentyl)benzene, p-bis(2-methyl-4-aminopentyl)benzene, p-bis(1,1-dimethyl-5-aminopentyl)benzene, 1,5-diaminonaphthalene, 2,6-diaminonaphthalene, 2,4-bis(β-amino-t-butyl)toluene, 2,4-diaminotoluene, m-xylene-2,5-diamine, p-xylene-2,5-diamine, m-xylylenediamine, p-xylylenediamine, 2,6-diaminopyridine, 2,5-diaminopyridine, 2,5-diamino-1,3,4-oxadiazole, 1,4-diamino-cyclohexane, piperazine, methylenediamine, ethylenediamine, propylenediamine, 2,2-dimethylpropylenediamine, tetramethylenediamine, pentamethylenediamine, hexamethylenediamine, 2,5-dimethylhexamethylenediamine, 3-methoxyhexamethylenediamine, heptamethylenediamine, 2,5-dimethylheptamethylenediamine, 3-methylheptamethylenediamine, 4,4-dimethylheptamethylenediamine, octamethylenediamine, nonamethylenediamine, 5-methylnonamethylenediamine, 2,5-dimethylnonamethylenediamine, decamethylenediamine, 1,10-diamino-1,10-dimethyldecane, 2,11-diaminododecane, 1,12-diaminooctadecane, 2,17-diaminoicosane, and 1,3-bis(3-aminophenoxy)benzene.

These silicone-modified polyimides are compounded for the purpose of firmly binding the primer layer to the substrate since they are excellent in adhesion with an inorganic material such as metal and the like as compared with a polyimide which is a heat resistant resin which has been conventionally used for a primer layer.

The ratio to be compounded of the fluororesin to the silicone-modified polyimide is preferably in the range of from 90:10 to 10:90, more preferably from 70:30 to 30:70 by weight. The reason for this is that when the compounded ratio of the fluororesin is over 90% by weight, adhesion between the substrate and the primer layer deteriorates, and on the other hand, when the compounded ratio of the silicone-modified polyimide is over 90% by weight, adhe sion between the fluororesin and the primer layer deteriorates.

(Other Additives)

In the primer composition, in addition to the essential components and a solvent for dissolving them, various additives can be used together for improving properties and conditions in the range which is not harmful to the effect of the present invention. For example, a surfactant such as polyoxyethylenephenyl ether and the like may be added for improving dispersibility of the fluororesin in the primer solution.

(Formation of the Primer Layer)

When a primer layer of a fixing member is formed using the second primer composition of the present invention, the primer layer is formed by coating on the surface of a substrate an adhesive primer solution prepared by dissolving the above-described silicone-modified polyimide or precursor thereof and the above-described fluororesin into a water-soluble organic solvent such as N-methyl-2-pyrrolidone, furfuryl alcohol, butanol, isopropanol, ethanol and the like. The ratio to be compounded of the silicone-modified polyimide to the fluororesin is preferably in the range of from 10:90 to 90:10, and more preferably from 30:70 to 70:30 by weight.

The above-described silicone-modified polyimide may be prepared in the form of a polyimide obtained by complete dehydration and condensation of the monomers, aromatic tetracarboxylic dianhydride and diamine, and compounded in an adhesive primer solution, or may be prepared in the form of a polyamic acid which is a partially dehydrated and condensed precursor and compounded in an adhesive primer solution. In view of processability and handling, the compounding of a polyamic acid into an adhesive primer solution is preferred.

The coating method is the same as for the first primer composition, and the film thickness of the primer layer is in the range of from 1 to 50 $\mu$m, and preferably 3 to 20 $\mu$m. The drying can be conducted by heating or air drying.

(Third Primer Composition)

The third primer composition of the present invention comprises a fluorine-containing polyimide resin. The third primer composition of the present invention preferably comprises a silane coupling agent together with the polyimide resin.

(Fluorine-containing Polyimide Resin)

The fluorine-containing polyimide resin used in the third primer composition of the present invention is a resin in which at least a perfluoroalkyl group or a fluorine-substituted aromatic ring is introduced into at least the skeleton of a monomer, being aromatic tetracarboxylic dianhydride or diamine.

Examples of the aromatic tetracarboxylic dianhydride or diamine into which the perfluoroalkyl group or fluorine-substituted aromatic ring is introduced are listed in Table 7.

When the perfluoroalkyl group or fluorine-substituted aromatic ring is contained only in the one monomer, diamine, examples of the aromatic tetracarboxylic dianhydride include, but are not limited to, "other tetracarboxylic dianhydrides" exemplified as a monomer of the silicone-modified polyimide used in the second primer composition. On the other hand, when the perfluoroalkyl group or fluorine-substituted aromatic ring is contained only in the one monomer, aromatic tetracarboxylic dianhydride, examples of the diamine include, but are not limited to, "other diamines" exemplified as a monomer of the silicone-modified polyimide used in the second primer composition.

TABLE 7

As the fluorine-containing polyimide resin in the present invention, those having skeletons as shown in Table 8 are preferred.
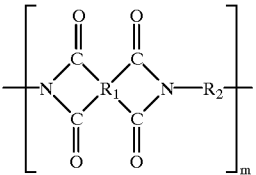
TABLE 8

TABLE 8-continued

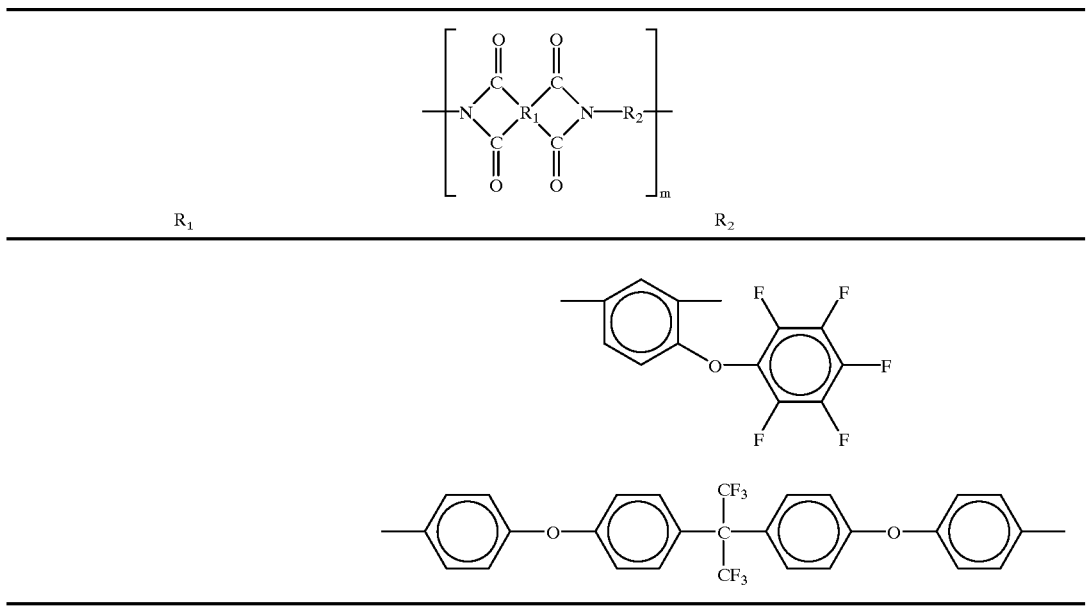

Among them, in view of processability and adhesion, thermosetting type compounds such as a fluorine-containing polyimide having nadic acid introduced into an end thereof, as shown in the following formula (4), and a fluorine-containing polyimide having acetylene introduced into an end thereof, as shown in the following formula (5), are particularly preferred.

compounded for obtaining firm adhesion between the fluororesin and the primer.

The above-described fluorine-containing polyimide maybe prepared in the form of a polyimide obtained by complete dehydration and condensation of the monomers, aromatic tetracarboxylic dianhydrice and diamine, and compounded in a primer solution for adhesion, or may be

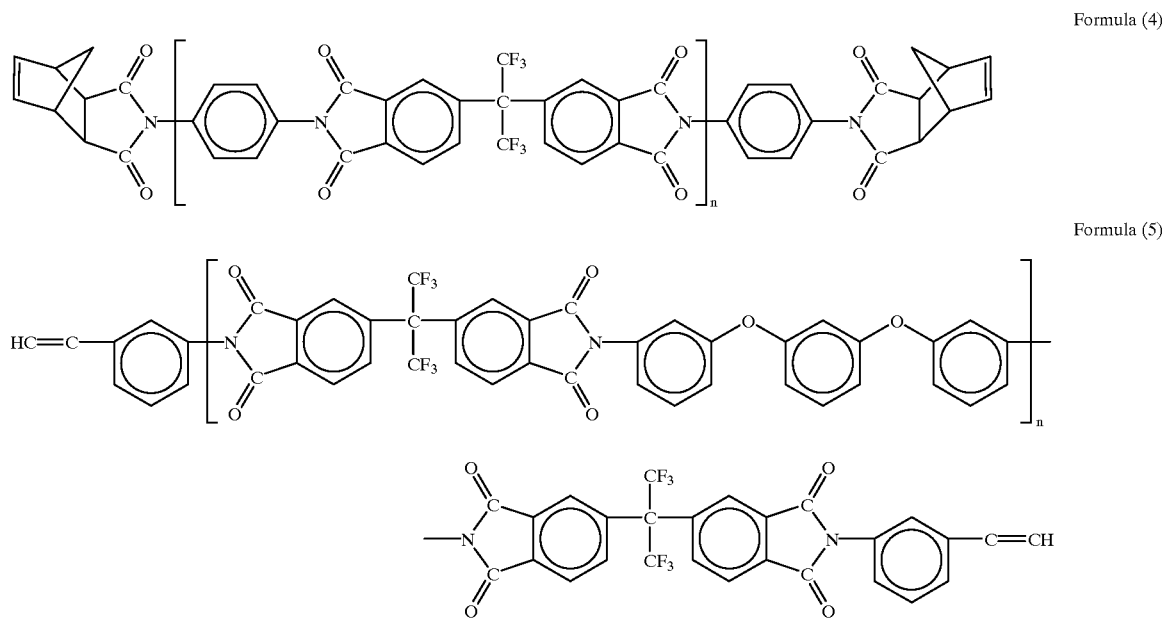

Formula (4)

Formula (5)

These fluorine-containing polyimides manifest excellent adhesion to the carrier, and are easily compatibilized with the fluororesin in the outermost releasing layer formed after the application of the above-described primer since they contain a fluorine atom. Therefore, these polyimides are prepared in the form of a polyamic acid which is a partially dehydrated and concentrated precursor and compounded in an adhesive primer solution. In view of processability and handling, the compounding of a polyamic acid into an adhesive primer solution is preferred.

(Silane Coupling Agent)

The printer layer in the present invention preferably further contains a silane coupling agent.

The use of the coupling agent is conducted while observing the difference in bonding energy, and the point thereof is to use the strong bonding energy of a covalent bond and not to use partial covalent bond adhesion or hydrogen bond adhesion, or the adhesion of a weak bonding force such as van der Waals force and the like, as with a conventional primer. As the silane coupling agent, the same compounds as those used in the first primer composition can be used.

(Other Additives)

In the primer composition, in addition to the essential components and a solvent for dissolving them, various additives can be used together for improving properties and conditions in the range which is not harmful to the effect of the present invention.

(Formation of Primer Layer)

When a primer layer of a fixing member is formed using the third primer composition of the present invention, the primer layer is formed by applying to the surface of a substrate an adhesive primer solution prepared by dissolving the above-described fluorine-containing polyimide or precursor thereof into a water-soluble organic solvent such as N-methyl-2-pyrrolidone, furfuryl alcohol, butanol, isopropanol, ethanol, and the like. When used in combination with a silane coupling agent, the primer layer is formed desirably by the wet pre-treatment method like the first primer composition.

When a primer layer is formed using a silane coupling agent by the integral blend method, the primer layer is formed by applying to the surface of a substrate an adhesive primer solution prepared by dissolving the above-described fluorine-containing polyimide or precursor thereof and the silane coupling agent together into a water-soluble organic solvent such as N-methyl-2-pyrrolidone, furfuryl alcohol, butanol, isopropanol, ethanol, and the like. In this case, the amount of the silane coupling agent to be added and mixed is preferably from 1% by weight to 20% by weight based on the primer solution, and more preferably from 1% by weight to 10% by weight.

Further, when a primer layer is formed using a silane coupling agent by the wet pre-treatment method, the primer layer is formed by applying to the surface of a substrate a first solution containing as a main agent a silane coupling agent, then, applying to the surface of the substrate on which the first solution has been applied and dried, a second solution prepared by dissolving in a water-soluble organic solvent the above-described fluorine-containing polyimide or precursor thereof. In this case, as the first solution, it is preferable to dilute the silane coupling agent with a solvent to be a concentration of from 1 to 20% by weight for use. As the solvent used in this case, almost all organic solvents such as alcohols, toluene, xylene, ethyl acetate, methylethylketone, acetone or a mixed solvent of alcohol with water, and the like, can be applied. Further, after the application of the first solution, it is preferable to remove the solvent by air drying, then, to conduct heat treatment at a temperature in the range of from 100 to 200° C. for increasing the strength of the primer layer.

The coating method is the same as for the first primer composition, and the film thickness of the primer layer after drying is preferably from 1 to 50 $\mu$m, and more preferably 3 to 20 $\mu$m. The drying can be conducted by heating or air drying. (Filler)

In the primer layer of the present invention, fillers may be appropriately compounded for improving the strength of the primer layer. These fillers can be used provided the adhesion between the substrate and the primer layer and between the primer layer and the fluororesin layer and the releasing properties required thereof as a fixing member are not lost.

As the filler, fine particles of metal, inorganic oxides such as $SiO_2$, $TiO_2$, $Al_2O_3$, MgO, CaO, $Fe_2O_3$ and the like, and inorganic materials such as SiC (silicon carbide), BN (boron nitride), $Si_3N_4$ (silicon nitride), and the like can be used. Among these, in view of its excellent heat resistance and durability as well as its low cost, $Fe_3O_3$ (iron oxide red) is particularly preferable.

When an inorganic filler is added to the primer layer, the content of the inorganic filler in the primer layer is preferably from 0.1% by weight to 50% by weight, and more preferably from 1% by weight to 30% by weight. The average particle size of the inorganic filler is desirably set at not more than 5 $\mu$m. When the average particle size is over 5 $\mu$m, there is the concern that the inorganic filler will tend to fallout from the primer layer. Further, in view of dispersibility, the inorganic filler having an average particle size of 0.001 $\mu$m or more is more preferable.

(Fluororesin Layer)

Next, the outermost layer among the layers formed on the substrate, i.e. the fluororesin layer, will be described.

As the fluororesin which forms the fluororesin layer of the present invention, a resin having excellent heat resistance is preferred for enabling continuous use at 200° C. or more by heating a roller, and in view of their resistance to mechanical stresses such as abrasion and the like and their releasing properties, perfluoroalkylvinyl ether-tetrafluoroethylene copolymer (PFA), polytetrafluoroethylene (PTFE), hexafluoropropylene-tetrafluoroethylene copolymer (FEP), and polyhexafluoropropylene are particularly preferred.

In the fluororesin layer in the present invention, fillers and other resins may be appropriately compounded for improving resistance to mechanical stresses such as abrasion and the like and releasing properties. These fillers and other resins can be used provided the adhesion between the substrate and the primer layer and between the primer layer and the fluororesin layer and the releasing properties required thereof as a fixing member are not lost.

As the filler, fine particles of metal, inorganic oxides such as $SiO_2$, $TiO_2$, $Al_2O_3$, MgO, CaO, $Fe_2O_3$ and the like, and inorganic materials such as SiC (silicon carbide), BN (boron nitride), $Si_3N_4$ (silicon nitride) and the like can be used. Among these, in view of their excellent resistance to mechanical stress such as abrasion and the like, SiC, BN and $Si_3N_4$ are particularly preferable.

When an inorganic filler is added to the fluororesin layer, the content of the inorganic filler in the fluororesin layer is preferably from 5% by weight to 50% by weight, and more preferably from 5% by weight to 15% by weight. The average particle size of the inorganic filler is desirably set at not more than 10 $\mu$m to provide the necessary film thickness. When the average particle size is over 10 $\mu$m, there is the concern that the inorganic filler will tend to fallout from the outermost layer.

As the other resin, heat resistant resins such as a polyamide, polyimide, polyamideimide, polybenzoimidazole, polyarylene sulfide, polyether, polyketone, aromatic polyester, silicone resins, and the like can be used, and among these, polymers in which either a perfluoroalkyl group or a fluorine-substituted aromatic ring has been introduced into the skeleton of either a silicone resin or these heat resistant resins are particularly preferred since their releasing properties are not lost.

When the other resin is added to the fluororesin layer, the content of the other resin in the fluororesin layer is preferably from 1% by weight to 50% by weight, and more preferably from 5% by weight to 20% by weight. Further, it is preferable that the softening point by heat of the other resin is equivalent to or more than that of the fluororesin.

The fluororesin layer in the present invention is formed by coating a fluororesin layer onto a formed primer layer when the primer layer is either dry or wet. The outermost layer, being the fluororesin layer, can be formed for example by, after uniformly applying a fluororesin powder or a dispersion of a fluororesin powder by a dipping method, spray method, or the like, using a dispersion method in which firing is effected at temperature where a fluororesin is melted, a tube inserting method in which a fluororesin tube is heated to be constricted, or an electrostatic coating method in which a PFA particles are adhered.

The thickness of the fluororesin layer is from 5 to 500 $\mu$m, and preferably from 20 to 50 $\mu$m when a primer composition containing a fluororesin and a coupling agent is used, from 0.1 to 100 $\mu$m, and preferably from 5 to 40 $\mu$m when a primer composition containing a fluororesin and a silicone-modified polyimide is used, and from 0.1 to 100 $\mu$m, and preferably from 5 to 40 $\mu$m when a primer composition containing a fluorine-containing polyimide resin is used. When the layer is too thin, then after a long period of use, the releasing layer on the surface is abraded to expose the primer layer and metal core roll surface, and the releasing properties are drastically reduced. When the layer is too thick, heat conductivity deteriorates and a long warm-up time is required.

(Fixing Apparatus)

The fixing member can be applied to a fixing device which conducts fixing by heating a toner image on a receiving member, the fixing member being used as a member which needs releasing properties on its surface, under the high temperature conditions of a heating roller, fixing belt, pressure roller pressed to contact with the heating roller and the like.

It is preferable that the fixing member has a heat source, and as examples of fixing devices which conduct fixing by heating a toner image on a receiving member, there is a fixing device comprising a heat roll, a pressure belt which press-contacts with the heat roll, and a pressure roll which presses the pressure belt from the rearside, a fixing device comprising a heat roll and a pressure roll which press-contacts with the heat roll, a fixing device comprising a heat belt, a pressure member which press-contact swith the inner side of the heat belt, and a pressure roll placed in a position opposite to the pressure member, a fixing device comprising a heat belt, pressure member which press-contacts with the inner side of the heat belt and a pressure belt placed in a position opposite to the pressure member, and the like.

Namely, in the above-described fixing apparatuses, the heat roll or heat belt, which contacts with a toner image on a receiving member, carries thereon a primer layer composed of the primer composition of the present invention and the outermost layer, which is a fluororesin layer. That is, the heat roll or heat belt carries a primer layer composed of a composition containing a heat resistant resin, fluororesin and coupling agent, a composition containing a fluororesin and silicone-modified polyimide, or a fluorine-containing polyimide resin, and the outermost layer, which is a fluororesin layer.

(Image Forming Method)

The fixing device using the fixing member of the present invention can be used in a process in which a developed image is fixed on a receiving member in an image forming method comprising a process in which a latent image is formed on a latent image supporting substrate, a process in which the latent image is developed using a developer, a process in which the developer is transferred on a receiving substrate, and a process in which the developed image is fixed on a receiving member. These processes themselves are general processes, and described, for example, in Japanese Patent Application Laid-Open (JP-A) Nos. 56-40868, 49-91231, and the like.

The fixing member of the present invention can be installed in an image forming apparatus which is known by itself such as a copying machine, a facsimile, and the like.

EXAMPLES

The following examples and comparative examples further illustrate the present invention specifically, but do not limit the scope thereof.

Primer layers of Examples 1 to 12 and Comparative Example 1 were produced under the following conditions using the first primer composition, and adhesion between the primer layer and metal substrate was evaluated by the following method.

(Evaluation Method of Adhesion)

Figure 2A:
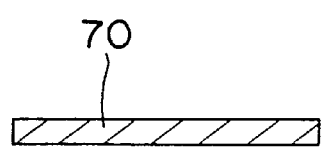
FIGS. 2A, 2B and 2C are views showing an outline of a tape peeling method for evaluating the adhesion between a substrate and a primer layer and the heat resistance thereof.
Figure 2B:
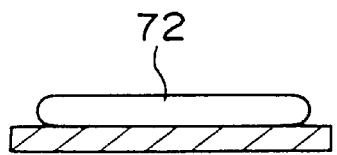
Figure 2C:
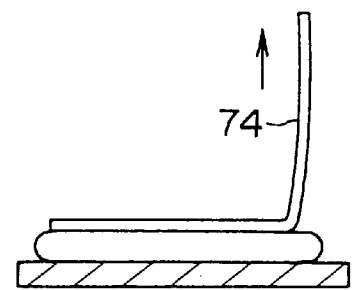

A primer layer was formed on an aluminum plate (thickness: 1 mm) having a mirror-like surface as a metal substrate under the following conditions, and adhesion between the aluminum plate and the primer layer and the heat resistance thereof was evaluated by the tape peeling method. FIGS. 2A, 2B, and 2C show a summary of the evaluation method. FIG. 2A shows the mirror-processed aluminum plate 70 which is a metal substrate. On the aluminum plate 70, the primer layer 72 was formed under the various conditions. In FIG. 2B, this primer layer 72 is shown with a single-layer structure, and may sometimes have a two-layer structure composed of a two-part primer composition. After the primer layer 72 was formed on the substrate and stored at 400° C. for 48 hours or at 350° C. for 120 hours, a cellophane tape 74 was then pasted on the primer layer 72 formed as shown in FIG. 2C, and one end of the tape 74 was then lifted at an angle of 90° to the pasted surface. In this operation, whether the primer layer portion peeled from the aluminum plate portion or not was evaluated. The evaluation was effected according to the following criteria.

○: no peeling at all

Δ: partial peeling

X : whole peeling

Example 1

On an aluminum plate having a mirror-like surface which had been degreased was coated a 3% by weight solution of a silane coupling agent (vinyltrimethoxysilane, KBM1003: manufactured by Shin-Etsu Chemical Co., Ltd.) as a primer first solution uniformly by a brush. The coated plate was heated and dried at 105° C. for 5 minutes. After drying, the thickness of the first primer layer was 8 $\mu$m.

Then, a primer second solution comprising 3% by weight of a polyamic acid as a precursor of a polyimide, 4% by weight of a PFA powder particle and 8% by weight of iron oxide (iron oxide red) to which were further added 60% by weight of water and 25% by weight of alcohol was coated by a brush, and the coated plate was heated and dried at 150° C. for 5 minutes. After drying, the thickness of the whole primer layer was 13 $\mu$m.

This test sample was evaluated by the above-described adhesion test, and no peeling was observed at all under any conditions. The details of the primer composition used and the results of the adhesion test are shown in Table 1 below.

Example 2

A test sample was prepared in the same manner as in Example 1 except that an epoxy-based silane coupling agent solution (γ-glycidoxypropyltrimethoxysilane, KBM403: manufactured by Shin-Etsu Chemical Co., Ltd.) was used instead of the silane coupling agent (vinyltrimethoxysilane, KBM1003: manufactured by Shin-Etsu Chemical Co., Ltd.) as a primer first solution, and the above-described adhesion test was conducted in the same manner to observe no peeling at all under any conditions. The results are shown in Table 1 below.

Example 3

A test sample was prepared in the same manner as in Example 1 except that a methacryl-based silane coupling agent solution (γ-methacryloxypropyltrimethoxysilane, KBM503: manufactured by Shin-Etsu Chemical Co., Ltd.) was used as a primer first solution, and the above-described adhesion test was conducted in the same manner to observe no peeling at all under any conditions. The results are shown in Table 1 below.

Examples 4 to 7

A test sample was prepared in the same manner as in Example 1 except that a mercapto-based silane coupling agent solution (γ-mercaptopropyltrimethoxysilane, KBM803: manufactured by Shin-Etsu Chemical Co., Ltd.) was used as a primer first solution, as Example 4. Test samples were prepared in the same manner as in Example 1 except that an aminoethyl-based silane coupling agent solution [N-β (aminoethyl) γ-aminopropyltrimethoxysilane, KBM603: manufactured by Shin-Etsu Chemical Co., Ltd.] was used in Example 5, a methyl-based silane coupling agent solution (methyltrimethoxysilane) was used in Example 6, and a methoxy-based silane coupling agent solution (tetramethoxysilane) was used in Example 7. The samples were subjected to the same adhesion test as in Example 1 to observe no peeling at all in any example. The results are shown in Table 1 below.

Example 8

An ethoxy group-vinyl-based silane coupling agent solution (vinyltriethoxysilane, KBE1003: manufactured by Shin-Etsu Chemical Co., Ltd.) was used as a primer first solution. This agent has an ethoxy group while—OR in the above-described general formula (1) in Examples 1 to 7 all represent a methoxy group. A test sample was prepared and the adhesion test was conducted in the same manner as in Example 1 to observe no peeling at all under any conditions. The results are shown in Table 1 below.

Example 9

A test sample was prepared and the adhesion test was conducted in the same manner as in Example 1, except that the same vinyltriethoxysilane (KBE1003: manufactured by Shin-Etsu Chemical Co., Ltd.) was used as a primer first solution and a polyamic acid as a polyimideamide precursor was used instead of the polyimide precursor in the primer second solution, to observe no peeling at all under any condition. The results are shown in Table 1 below.

Example 10

A test sample was prepared and the adhesion test was conducted in the same manner as in Example 1, except that the same vinyltriethoxysilane (KBE1003: manufactured by Shin-Etsu Chemical Co., Ltd.) was used as a primer first solution and polyether sulfone was used instead of the polyimide precursor in the primer second solution, to observe no peeling at all under any condition. The results are shown in Table 1 below.

Example 11

A Test sample was prepared and the adhesion test was conducted in the same manner as in Example 1, except that the same vinyltriethoxysilane (KBE1003: manufactured by Shin-Etsu Chemical Co., Ltd.) was used as a primer first solution and polyphenylene sulfide was used instead of the polyimide precursor in the primer second solution, to observe no peeling at all under any conditions. The results are shown in Table 1 below.

Comparative Example 13

Into the primer second solution used in Example 1 was mixed a vinyl-based silane coupling agent solution (vinyltrimethoxysilane KBM1003: manufactured by Shin-Etsu Chemical Co., Ltd.), which had been regulated to have a concentration of 5% by weight, to prepare a composition used in the integral blend method, namely, a single-part type primer composition. This primer composition solution was applied to an aluminum plate by a brush and heated and dried at 150° C. for 5 minutes to give a test sample. The thickness of the primer layer after drying was 12 μm. This test sample was made and subjected to the same adhesion test. When the sample was heated at 400° C. for 48 hours, no peeling was observed, and only when the sample was heated at 350° C. for 120 hours, was slight peeling observed, however, it was judged to be within the practical permissible range. The results are shown in Table 2.

Comparative Example 1

A water-soluble composition containing 3% by weight of the same polyamic acid as the polyimide precursor used in Example 1, 4% by weight of a PFA powder particle, and 8% by weight of iron oxide was prepared as a single-part type primer composition of conventional type, and this composition was applied to an aluminum plate by a brush and heated and dried at 150° C. for 5 minutes to give a test sample. The thickness of the primer layer after drying was 10 μm. This test sample was subjected to the same adhesion test as in Example 1, to observe peeling under all conditions, and it was found that it had no practical adhesion strength. The evaluation results are shown in Table 2.

TABLE 1

| | Silane coupling agent in primer first solution | | Constituent component in primer second solution | Tape peeling test | |
|---|---|---|---|---|---|
| | —OR | X | | 400° C. 48 hrs | 350° C. 120 hrs |
| Example 1 | Methoxy group | Vinyl group | Polyamide precursor PFA particles, iron oxide | ◯ | ◯ |
| Example 2 | Methoxy group | Epoxy group | Polyamide precursor PFA particles, iron oxide | ◯ | ◯ |
| Example 3 | Methoxy group | Methacryl group | Polyamide precursor PFA particles, iron oxide | ◯ | ◯ |
| Exam- | Methoxy | Mercapto | Polyamide precursor | ◯ | ◯ |

TABLE 1-continued

| | Silane coupling agent in primer first solution | | Constituent component in primer second solution | Tape peeling test | |
|---|---|---|---|---|---|
| | | | | 400° C. 48 hrs | 350° C. 120 hrs |
| | —OR | X | | | |
| ple 4 | group | group | PFA particles, iron oxide | | |
| Example 5 | Methoxy group | Amino group | Polyamide precursor PFA particles, iron oxide | ○ | ○ |
| Example 6 | Methoxy group | Methyl group | Polyamide precursor PFA particles, iron oxide | ○ | ○ |
| Example 7 | Methoxy group | — | Polyamide precursor PFA particles, iron oxide | ○ | ○ |
| Example 8 | Ethoxy group | Vinyl group | Polyamide precursor PFA particles, iron oxide | ○ | ○ |
| Example 9 | Ethoxy group | Vinyl group | Polyamideimide precursor PFA particles, iron oxide | ○ | |
| Example 10 | Ethoxy group | Vinyl group | Polyether sulfone PFA particles, iron oxide | ○ | ○ |
| Example 11 | Ethoxy group | Vinyl group | Polyphenylene sulfide PFA particles, iron oxide | ○ | ○ |

TABLE 2

| | Silane coupling agent in primer layer | | Constituent component other than silane coupling agent used in primer layer | Tape peeling test | |
|---|---|---|---|---|---|
| | | | | 400° C. 48 hrs | 350° C. 120 hrs |
| | —OR | X | | | |
| Comparative Example 13 | Ethoxy group | Vinyl group | Polyimide precursor PFA particles, iron oxide | ○ | Δ |
| Comparative Example 1 | — | — | Polyimide precursor PFA particles, iron oxide | X | X |

Note:
Each one is a single-part type primer composition

From the evaluation results shown in Tables 1 and 2, it was confirmed that all of the primer compositions of the present invention had sufficient adhesion with a metal substrate and heat resistance. Further, from the comparison of Examples 1 to 11 with Example 12, it was confirmed that a two-part type primer composition had excellent adhesion and heat resistance as compared with a single-part type composition when the same silane coupling agent was used.

Next, examples are shown in which each primer composition shown in the examples was applied to a member heated and passed through an actual machine.

(Evaluation Method for Heat Roll and Heat Belt)

Evaluation was conducted by a peeling test method using a load cell shown in FIGS. 3A and 3B and a paper-feeding endurance test using an actual machine. The peeling test method using a load cell is conducted as follows. FIG. 3A is a view showing an outline of the peeling test method when the test sample is a heat roll 1. In this test, the surface of the heat roll 1 is cut by a knife to make a cut groove having a width of 1 cm along a circumferential direction, a part of the primer layer 102 and the fluororesin layer 104 of a metal core 100 which is a substrate is peeled, the end 106 thereof is attached to the chuck of a peeling test machine and lifted at an angle of 90° to the circumferential direction, and the force used when it peels off is measured. FIG. 3B is a view showing an outline of the peeling test method when the test sample is a heat belt 6. In this test, the surface of the heat belt 6 is cut by a knife to make a cut groove having a width of 1 cm along a circumferential direction, a part of the primer layer 202 and the fluororesin layer 204 of a belt 200 which is a substrate is peeled, the end 206 thereof is attached to the chuck of a peeling test machine and lifted at an angle of 90° to the circumferential direction, and the force used when it peels off is measured.

In the paper-feeding endurance test using an actual machine, a heat roll and heat belt were placed in the fixing portion of a copying machine, the surface temperature was set at 200° C., and the paper was fed continuously.

Example 13

(Production of Heat Roll 1 in FIG. 1)

An aluminum hollow core metal 2 having an outer diameter of 50 mm⌀ which had been subjected to de-greasing treatment and surface roughing treatment by sandblasting was prepared as a substrate, and an ethoxy-based silane coupling agent solution (tetraethoxysilane, KBE04: manufactured by Shin-Etsu Chemical Co., Ltd.) was coated by spraying as a coupling agent-containing primer first solution and heated and dried at 105° C. for 5 minutes. Then, a primer second solution composed of the polyamic acid used in Example 1, PFA particles and iron oxide was applied by spraying and dried at 105° C. for 5 minutes to form a primer layer, then, a powder resin paint of PFA was applied uniformly by an electrostatic coating method, and curing treatment and PFA film-forming treatment were conducted under firing conditions of 375° C. for 30 minutes to form a fluororesin layer. After firing, the surface was polished by a polishing film to obtain a heat roll 1. The thickness of the resulting film after drying of the primer solution was 8 to 10 μm, and the whole film thickness after PFA film-forming was 41 to 45 μm.

(Evaluation of Heat Roll 1 in FIG. 1)

The peeling strength between the metal surface and the primer layer was measured using this heat roll 1. Evaluation of the peeling strength was conducted by the above-described peeling test method using the load test cell. The results are shown in Table 3. The heat roll 1 was placed in the fixing portion of a copying machine having the same constitution as in FIG. 1 (Vivace 550: manufactured by Fuji Xerox K. K.), and the paper-feeding endurance test was conducted at a surface temperature of 200° C. with no malfunction found even after 500,000 sheets were fed.

Comparative Example 2

(Production of Heat Roll 1 in FIG. 1)

In the same manner as in Example 13, an aluminum hollow core metal 2 having an outer diameter of 50 mm⌀, which had been subjected to de-greasing treatment and surface roughing treatment by sandblasting, was prepared as a substrate, to this was applied the primer solution used in Comparative Example 1 by spraying, then, a PFA powder resin paint was applied uniformly by an electrostatic coating method, and curing treatment and PFA film-forming treatment were conducted under firing conditions of 375° C. for 30 minutes to form a fluororesin layer. After firing, the surface was polished by a polishing film to obtain a heat roll 1. The thickness of the resulting film after drying of the primer solution was 7 to 10 μm, and the whole film thickness after PFA film-forming was 41 to 44 μm.

(Evaluation of Heat Roll 1 in FIG. 1)

The evaluation was conducted in the same manner as in Example 13. The evaluation results of the peeling strength are shown in Table 3. In the paper-feeding endurance test, peeling occurred between the substrate and the primer layer after 300,000 sheets were fed.

(Production of Heat Roll 1 in FIG. 1)

The production and evaluation of the heat roll 1 were conducted in the same manner as in Example 13 except that a dispersion of PFA was coated in the formation of the outermost layer, being the fluororesin layer. The evaluation results of the peeling strength are shown in Table 3. In the paper-feeding endurance test, there was no malfunction even after 500,000 sheets were fed.

pared with conventional products, and the durability thereof was excellent even when it was actually used under heated conditions.

Next, a primer layer was formed on a heat roll and heat belt using the second primer composition as described below and the evaluation was conducted.

Example 15

(Preparation of Primer Solution for Adhesion)

To 100 parts by weight of a solvent obtained by mixing water, N-methyl-2-pyrrolidone and furfuryl alcohol at a ratio of 4:2:1, were added 20 parts by weight of a polyamic acid represented by the formula (6) described below as a precursor of a silicone-modified polyimide, 15 parts by weight of a PFA particle (average particle size: 0.2 μm) dispersion having a concentration of 60% by weight, and 11 parts by weight of $Fe_2O_3$ (iron oxide red, particle size 0.1 μm) as an inorganic filler, then, the mixture was mixed and dispersed uniformly to prepare an adhesive primer solution.

Formula (6)

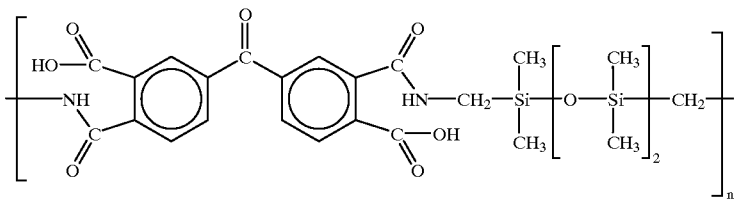

TABLE 3

|  | Example 13 | Example 14 | Comparative Example 2 |
|---|---|---|---|
| Peeling strength (g/cm) | | | |
| Initial strength | No peeling (Breaking of primer layer) | No peeling (Breaking of primer layer) | No peeling (Breaking of primer layer) |
| Strength after 200,000 sheets are fed | 500 | 450 | 300 |
| Number of sheets feed in paper-feeding endurance test in copying machine | No malfunction after 500,000 sheets fed | No malfunction after 500,000 sheets fed | Peeling between substrate and primer layer after 300,000 sheets fed |

As is apparent from Table 3, it was found that no peeling occurred between the metal substrate and the primer layer, however, the primer layer was broken during the initial period in each of Examples 13 and 14 and Comparative Example 2. Moreover, a large difference was evident in the peeling strength after 200,000 sheets were fed in the peeling test.

When the continuous paper feeding endurance test was conducted in a copying machine equipped with the heat roller of Examples 13 and 14, no malfunction occurred even after 500,000 sheets were fed. On the other hand, in the copying machine equipped with the heat roller of Comparative Example 2, interlayer peeling occurred between the metal substrate and the primer layer.

As described above, it was found that the heated member of the present invention had higher adhesive strength between the metal substrate and the surface layer as com- (Production of Heat Roll 1 in FIG. 1)

An aluminum hollow core metal 2 having an outer diameter of 50 mm$^\phi$ which had been subjected to de-greasing treatment and surface roughing treatment by sandblasting was prepared as a substrate, and the above-described primer solution for adhesion was applied by spraying and dried at 150° C. for 5 minutes to form a primer layer, then, a powder resin paint of PFA was applied uniformly by an electrostatic coating method, and curing treatment and PFA film-forming treatment were conducted under firing conditions of 375° C. for 30 minutes to form a fluororesin layer. After firing, the surface was polished by a polishing film to obtain a heat roll 1. The thickness of the resulting film after drying of the primer solution was 11 to 13 μm, and the whole film thickness after PFA film-forming was 47 to 52 μm.

(Evaluation of Heat Roll 1 in FIG. 1)

The peeling strength between the metal surface and the primer layer was measured using this heat roll 1. Evaluation of the peeling strength was conducted by the above-described peeling test method using the load test cell. The results are shown in Table 4. The heat roll 1 was placed in the fixing portion of a copying machine having the same construction as in FIG. 1 (Vivace 550: manufactured by Fuji Xerox K. K.), and a paper-feeding endurance test was conducted at a surface temperature of 200° C. with no malfunction occurring even after 500,000 sheets were fed.

TABLE 4

| | Supporting Substrate | Adhesive Primer Polyimide | Presence or absence of PFA dispersion | Coating method of fluororesin layer | Peeling strength after 200,000 sheets fed | Number of sheets fed |
|---|---|---|---|---|---|---|
| Example 15 | Aluminum hollow core metal | Silicone-modified represented by formula (6) | Present | Electrostatic coating → firing | 500 | 500,000 |
| Example 16 | ↑ | Silicone-modified polyimide represented by formula (7) | ↑ | ↑ | 500 | 500,000 |
| Example 17 | ↑ | Silicone-modified polyimide represented by formula (8) | ↑ | ↑ | 510 | 500,000 |
| Example 18 | ↑ | Silicone-modified polyimide represented by formula (6) | ↑ | Tube | 480 | 500,000 |
| Example 19 | Polyimide belt containing filler | Silicone-modified polyimide represented by formula (8) | ↑ | Electrostatic coating → firing | 478 | 500,000 |
| Comparative Example 3 | Aluminum hollow core metal | Conventional polyimide | Present | Electrostatic coating → firing | 305 | 300,000 peeling between carrier and adhesive layer |
| Comparative Example 4 | ↑ | ↑ | ↑ | Tube | 295 | 280,000 peeling between carrier and adhesive layer |
| Comparative Example 5 | ↑ | Silicone-modified polyimide represented by formula (8) | Absent | Electrostatic coating → firing | 204 | 180,000 peeling between adhesive layer and outermost layer |
| Comparative Example 6 | Polyimide belt containing filler | Conventional polyimide | Present | ↑ | 295 | 280,000 peeling between adhesive layer and outermost layer |

Example 16

The production and evaluation of the heat roll 1 were conducted in the same manner as in Example 15 except that the precursor of the silicone-modified polyimide was changed to a polyamic acid represented by the formula (7) in the preparation of the adhesive primer solution. The measurement results of the peeling strength are shown in Table 4. In the paper-feeding endurance test, no malfunction occurred even after 500,000 sheets had been fed.

Example 17

The production and evaluation of the heat roll 1 were conducted in the same manner as in Example 15 except that the precursor of the silicone-modified polyimide was changed to a polyamic acid represented by the formula (7) in the preparation of the adhesive primer solution. The measurement results of the peeling strength are shown in Table 4. In the paper-feeding endurance test, no malfunction occurred even after 500,000 sheets had been fed.

Formula (7)

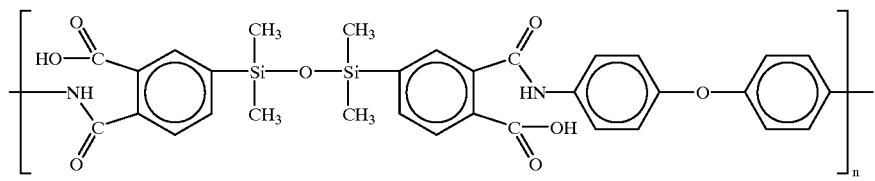

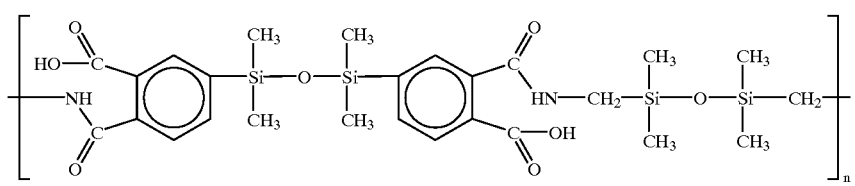

Formula (8)

Example 18

The production and evaluation of the heat roll 1 were conducted in the same manner as in Example 15 except that a method was used in which a PFA tube was fused by being heated and shrunk in the formation of the outermost layer, being a fluororesin layer. The measurement results of the peeling strength are shown in Table 4. In the paper-feeding endurance test, no malfunction occurred even after 500,000 sheets were fed.

Example 19

Figure 4:
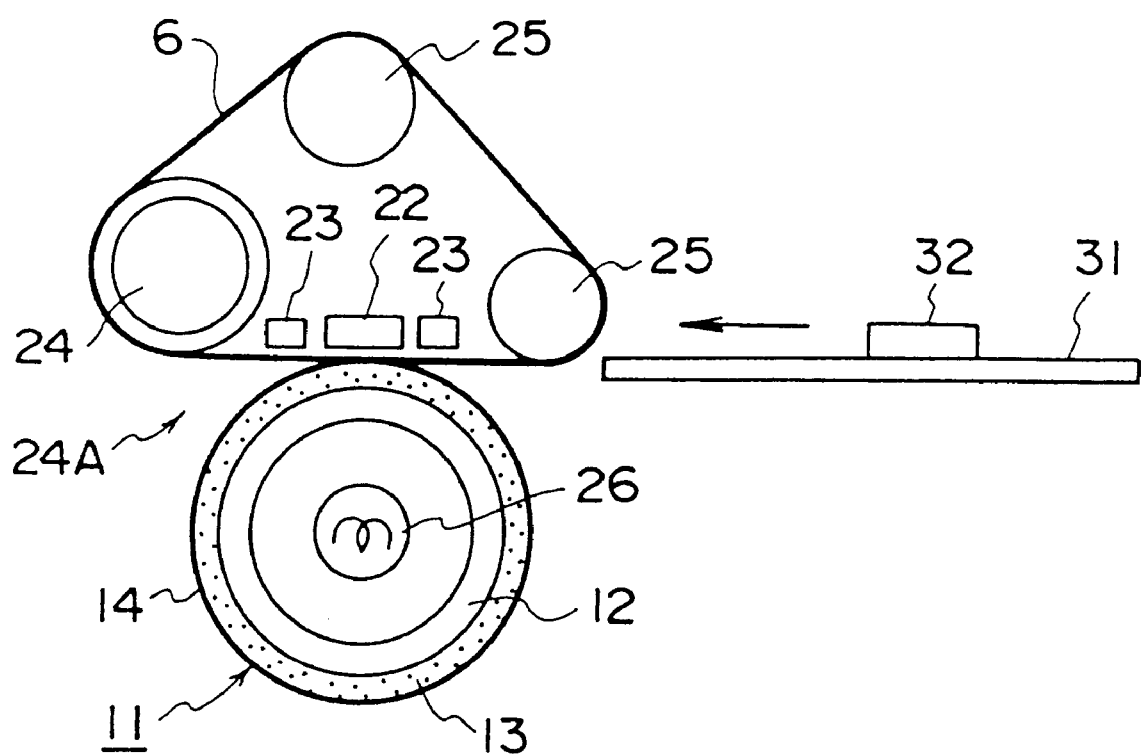
FIG. 4 is a schematic sectional view showing an example of an integrated belt type fixing apparatus used for fixing methods in examples of the present invention.

(Production of Heat Belt 6 in FIG. 4)

A belt made of a polyimide film having a thickness of 0.2 mm to which $SiO_2$ fine particles (primary particle size: about 20 nm) had been added in a ratio of 20% by weight as a filler was prepared as a substrate, and the same adhesive primer solution as that in Example 3 was applied by spraying and dried at 150° C. for 5 minutes to form a primer layer, then, a PFA powder resin paint was applied uniformly by an electrostatic coating method, and curing treatment and PFA film-forming treatment were conducted under firing condition of 350° C. for 40 minutes to form a fluororesin layer. After firing, the surface was polished by a polishing film to obtain a heat belt 6. The thickness of the resulting film after drying of the primer was 11 to 13 μm, and the whole film thickness after PFA film-forming was 47 to 52 μm.

(Evaluation of Heat Belt 6 in FIG. 4)

The strength between the belt surface and the primer layer was measured using this heat belt 6. Evaluation of the peeling strength was conducted by the above-described peeling test method using the load cell. The results are shown in Table 4. The fixing portion of a copying machine (Vivace 550: manufactured by Fuji Xerox K. K.) was exchanged for a fixing portion having the same construction as in FIG. 4, and the heat belt 6 was placed in this fixing portion, and a paper-feeding endurance test was conducted at a surface temperature of 200° C. resulting in no malfunction being found even after 500,000 sheets were fed.

Comparative Example 3

(Preparation of Primer Solution for Adhesion)

An adhesive primer solution was prepared in the same manner as in Example 15 except that a conventional polyimide precursor, represented by the following formula (9) and produced by reacting pyromellitic anhydride with 4,4'-diaminodiphenylsulfonic acid, was used instead of the precursor, of the silicone-modified polyimide.

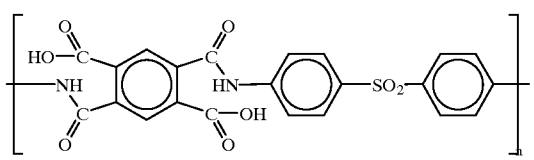

Formula (9)

(Production of Heat Roll 1 in FIG. 1)

In the same manner as in Example 15, an aluminum hollow core metal 2 having an outer diameter of 50 mm⌀ which had been subjected to de-greasing treatment and surface roughing treatment by sandblasting was prepared as a substrate, and the above-described adhesive primer solution was applied by spraying and dried at 150° C. for 5 minutes to form a primer layer, then a PFA powder resin was applied uniformly by an electrostatic coating method, and curing treatment and PFA film-forming treatment were conducted under firing conditions of 375° C. for 30 minutes to form a fluororesin layer. After firing, the surface was polished by a polishing film to obtain a heat roll 1. The thickness of the resulting film after drying of the primer solution was 10 to 12 μm, and the whole film thickness after PFA film-forming was 46 to 51 μm.

(Evaluation of Heat Roll 1 in FIG. 1)

The evaluation was conducted in the same manner as in Example 15. The evaluation results of the peeling strength are shown in Table 4. In the paper-feeding endurance test, peeling occurred between the substrate and the primer layer when the number of sheets fed exceeded 300,000.

Comparative Example 4

The production and evaluation of the heat roll 1 were conducted in the same manner as in Comparative Example 3 except that a PFA tube was fused by being heated and shrunk in the formation of the outermost layer, being a fluororesin layer. The measurement results of the peeling strength are shown in Table 4. In the paper-feeding endurance test, peeling occurred between the substrate and the primer layer when the number of sheets fed exceeded 280,000.

Comparative Example 5

The production and evaluation of the heat roll 1 were conducted in the same manner as in Example 17 except that the PFA particle (average particle size: 0.2 μm) dispersion was not compounded in the preparation of the primer solution for adhesion. The measurement results of the peeling strength are shown in Table 4. In the paper-feeding endurance test, peeling occurred between the substrate and the primer layer when the number of sheets fed exceeded 180,000.

Comparative Example 6
(Production of Heat Belt 6 in FIG. 4)

In the same manner as in Example 19, a belt made of a polyimide film having a thickness of 0.2 mm, to which $SiO_2$ fine particles (primary particle size: about 20 nm) had been added in a ratio of 20% by weight as a filler, was used as a substrate, and the same adhesive primer solution as that in Comparative Example 3 was applied by spraying and dried at 150° C. for 5 minutes to form a primer layer, then, a PFA powder resin paint was applied uniformly by an electrostatic coating method, and curing treatment and PFA film-forming treatment were conducted under firing conditions of 350° C. for 40 minutes to form a fluororesin layer. After firing, the surface was polished by a polishing film to obtain a heat belt 6. The thickness of the resulting film after drying of the primer was 10 to 13 μm, and the whole film thickness after PFA film-forming was 46 to 50

(Evaluation of Heat Belt 6 in FIG. 4)

The evaluation was conducted in the same manner as in Example 21. The evaluation results of the peeling strength are shown in Table 4. In the paper-feeding endurance test, peeling occurred between the substrate and the primer layer when the number of sheets fed exceeded 280,000.

Next, a primer layer was formed on a heat roll and heat belt using the third primer composition as described below and the evaluation was conducted.

Example 20
(Preparation of Adhesive Primer Solution)

To 100 parts by weight of a solvent obtained by mixing water, N-methyl-2-pyrrolidone and furfuryl alcohol at a ratio-of 4:2:1 were added 17 parts by weight of a polyamic acid represented by the formula (10) described below as a precursor of a fluorine-containing polyimide, and 11 parts by weight of $Fe_2O_3$ (iron oxide red, particle size 0.1 μm) as an inorganic filler, then, the mixture was mixed and dispersed uniformly to prepare an adhesive primer solution.

(Production of Heat Roll 1 in FIG. 1)

An aluminum hollow core metal 2 having an outer diameter of 50 mm$^\phi$ which had been subjected to de-greasing treatment and surface roughing treatment by sandblasting was prepared as a substrate, then, a PFA powder resin paint was applied uniformly by an electrostatic coating method, and curing treatment and PFA film-forming treatment were conducted under firing conditions of 375° C. for 30 minutes to form a fluororesin layer. After firing, the surface was polished by a polishing film to obtain a heat roll 1. The thickness of the resulting film after drying of the primer solution was 10 to 13 μm, and the whole film thickness after PFA film-forming was 47 to 53 μm.

(Evaluation of Heat Roll 1 in FIG. 1)

The peeling strength between the metal surface and the primer layer was measured using this heat roll 1. Evaluation of the peeling strength was conducted by the above-described peeling test method using a load cell. The results are shown in Table 4. The heat roll 1 was placed in the fixing portion of a copying machine having the same construction as in FIG. 1 (Vivace 550: manufactured by Fuji Xerox K. K.), and a paper-feeding endurance test was conducted at a surface temperature of 200° C. with no malfunction occurring even after 500,000 sheets were fed.

Formula (10)

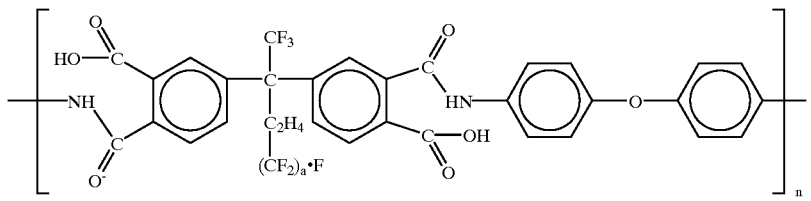

50

TABLE 5

| | Supporting Substrate | Polyimide | adhesive Primer | | | | |
|---|---|---|---|---|---|---|---|
| | | | Reactive group of silane coupling agent Upper: metal side (—OR) Lower: resin side (—X) | Method for using silane coupling agent | Coating method of fluororesin layer | Peeling strength after 200,000 sheets fed | Number of sheets fed |
| Example 20 | Aluminum hollow core metal | Silicone-modified polyimide represented by formula (10) | Not used | ← | Electrostatic coating → firing | 472 | 500,000 |
| Example 21 | ↑ | Silicone-modified polyimide | Not used | ← | ↑ | 500 | 500,000 |

TABLE 5-continued

| | Supporting Substrate | Polyimide | adhesive Primer Reactive group of silane coupling agent Upper: metal side (—OR) Lower: resin side (—X) | Method for using silane coupling agent | Coating method of fluororesin layer | Peeling strength after 200,000 sheets fed | Number of sheets fed |
|---|---|---|---|---|---|---|---|
| Example 22 | Aluminum hollow core metal | Silicone-modified polyimide represented by formula (10) | represented by formula (11) Methoxy group Vinyl group | Pre-treatment method | Electrostatic coating → firing | 472 | 500,000 |
| Example 23 | ↑ | Silicone-modified polyimide represented by formula (11) | Methoxy group Epoxy group | ↑ | ↑ | 500 | 500,000 |
| Example 24 | ↑ | Silicone-modified polyimide represented by formula (10) | Methoxy group Vinyl group | ↑ | Tube | 460 | 500000 pieces |
| Example 25 | ↑ | Silicone-modified polyimide represented by formula (11) | Methoxy group Epoxy group | ↑ | ↑ | 495 | 500000 pieces |
| Example 26 | Polyimide belt containing filler | Silicone-modified polyimide represented by formula (10) | Methoxy group Vinyl group | ↑ | Electrostatic coating → firing | 480 | 500000 pieces |
| Example 27 | ↑ | ↑ | Methoxy group Epoxy group | ↑ | ↑ | 510 | 500000 pieces |

Example 21

The production and evaluation of the heat roll 1 were conducted in the same manner as in Example 20 except that the precursor of the fluorine-containing polyimide was changed to a polyamic acid represented by the formula (11) in the preparation of the adhesive primer solution. The measurement results of the peeling strength are shown in Table 5. In the paper-feeding endurance test, no malfunction occurred even after 500,000 sheets were fed.

Example 22

(Preparation of Adhesive Primer Solution)

An adhesive primer solution was prepared in the same manner as in Example 20.

(Production of Heat Roll 1 in FIG. 1)

An aluminum hollow core metal 2 having an outer diameter of 50 mm° which had been subjected to de-greasing treatment and surface roughing treatment by sandblasting was prepared as a substrate, a vinyl-based silane coupling agent "KBM1003" (manufactured by Shin-Etsu Chemical Co., Ltd.) was used as the silane coupling agent and this was applied by spraying and then dried at 105° C. for 5 minutes. Then, the adhesive primer solution was applied by spraying and dried at 150° C. for 5 minutes to form a primer layer, then, a PFA powder resin paint was applied uniformly by an electrostatic coating method, and curing treatment and PFA film-forming treatment were conducted under firing conditions of 375° C. for 30 minutes to form a fluororesin layer. After firing, the surface was polished by a polishing film to obtain a heat roll 1. The thickness of the resulting film after drying of the primer solution was 11 to 14 μm, and the whole film thickness after PFA film-forming was 48 to 53 μm.

(Evaluation of Heat Roll 1 in FIG. 1)

Formula (11)

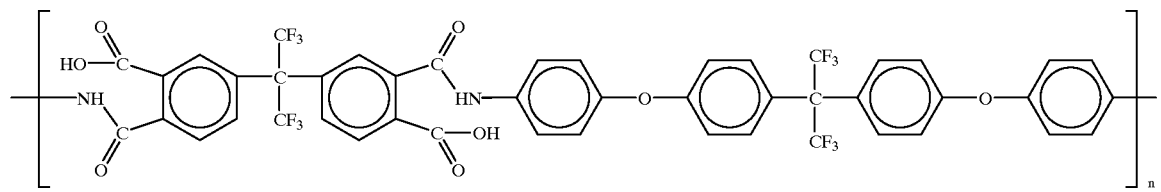

The evaluation was conducted in the same manner as in Example 20 using this heat roll 1. The measurement results of the peeling strength are shown in Table 5. In the paper-feeding endurance test, no malfunction occurred even after 500,000 sheets were fed.

Example 23

The production and evaluation of the heat roll 1 were conducted in the same manner as in Example 21 except that the coupling agent was changed to an epoxy-based silane coupling agent "KBM403" (manufactured by Shin-Etsu Chemical Co., Ltd.). The measurement results of the peeling strength are shown in Table 5. In the paper-feeding endurance test, no malfunction occurred even after 500,000 sheets were fed.

Example 24

The production and evaluation of the heat roll 1 were conducted in the same manner as in Example 22 except that a PFA tube was heated and shrunk to be fused in the formation of the outermost layer, being a fluororesin layer. The measurement results of the peeling strength are shown in Table 5. In the paper-feeding endurance test, no malfunction occurred even after 500,000 sheets were fed.

Example 25

The production and evaluation of the heat roll 1 were conducted in the same manner as in Example 24 except that the coupling agent was changed to an epoxy-based silane coupling agent "KBM403" (manufactured by Shin-Etsu Chemical Co., Ltd.). The measurement results of the peeling strength are shown in Table 5. In the paper-feeding endurance test, no malfunction occurred even after 500,000 sheets were fed.

Example 26
(Production of Heat Belt 6 in FIG. 4)

A belt made of a polyimide film having a thickness of 0.2 mm, to which $SiO_2$ fine particles (primary particle size: about 20 nm) had been added in a ratio of 20% by weight as a filler, was prepared as a substrate, a vinyl-based silane coupling agent "KBM1003" (manufactured by Shin-Etsu Chemical Co., Ltd.) was used as a silane coupling agent and this was applied by spraying and dried at 105° C. for 5 minutes. Then, the same primer solution as in Example 22 was applied by spraying and dried at 150° C. for 5 minutes to form a primer layer, then, a PFA powder resin paint was applied uniformly by an electrostatic coating method, and curing treatment and PFA film-forming treatment were conducted under firing conditions of 350° C. for 40 minutes to form a fluororesin layer. After firing, the surface was polished by a polishing film to obtain a heat belt 6. The thickness of the resulting film after drying of the primer solution was 11 to 13 μm, and the whole film thickness after PFA film-forming was 47 to 52 μm.
(Evaluation of Heat Belt 6 in FIG. 4)

The peeling strength between the belt surface and the primer layer was measured using this heat belt 6. Evaluation of the peeling strength was conducted by the above-described peeling test method using a load cell. The results are shown in Table 5. The fixing portion of a copying machine (Vivace 550: manufactured by Fuji Xerox K. K.) was exchanged for a fixing portion having the same construction as in FIG. 4, and the heat belt 6 was placed in this fixing portion. A paper-feeding endurance test was then conducted at a surface temperature of 200° C. resulting in no malfunction occurring even after 500,000 sheets had been fed.

Example 27

The production and evaluation of the heat belt 6 were conducted in the same manner as in Example 26 except that the coupling agent was changed to an epoxy-based silane coupling agent "KBM403" (manufactured by Shin-Etsu Chemical Co., Ltd.). The measurement results of the peeling strength are shown in Table 5. In the paper-feeding endurance test, no malfunction occurred even after 500,000 sheets were fed.

Comparative Example 7
(Preparation of Adhesive Primer Solution)

An adhesive primer solution was prepared in the same manner as in Example 20 except that a conventional polyimide precursor, represented by the following formula (12) produced by reacting pyromellitic anhydride with 4,4'-diaminodiphenylsulfonic acid, was used instead of the precursor of the fluorine-containing polyimide.

Formula (12)

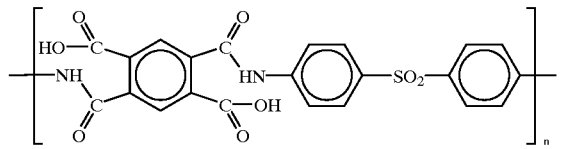

(Production of Heat Roll 1 in FIG. 1)

In the same manner as in Example 20, an aluminum hollow core metal 2 having an outer diameter of 50 mm⌀ which had been subjected to de-greasing treatment and surface roughing treatment by sandblasting was prepared as a substrate. The substrate was not treated with a silane coupling agent, and the above-described adhesive primer solution was applied by spraying and dried at 150° C. for 5 minutes to form a primer layer, then a PFA powder resin was applied uniformly by an electrostatic coating method, and curing treatment and PFA film-forming treatment were conducted under firing condition of 375° C. for 30 minutes to form a fluororesin layer. After firing, the surface was polished by a polishing film to obtain a heat roll 1. The thickness of the resulting film after drying of the primer solution was 10 to 12 μm, and the whole film thickness after PFA film-forming was 45 to 50 μm.
(Evaluation of Heat Roll 1 in FIG. 1)

The evaluation was conducted in the same manner as in Example 20. The evaluation results of the peeling strength are shown in Table 6. In the paper-feeding endurance test, peeling occurred not only between the hollow core metal and the primer layer but also between the fluororesin layer and the primer layer when the number of sheets fed exceeded 210,000.

TABLE 6

|  | Supporting Substrate | Polyimide | adhesive Primer | | Coating method of fluororesin layer | Peeling strength after 200,000 sheets fed [g/cm] | Number of sheets fed |
|  |  |  | Reactive group of silane coupling agent Upper: metal side (—OR) Lower: resin side (—X) | Method for using silane coupling agent |  |  |  |
| --- | --- | --- | --- | --- | --- | --- | --- |
| Comparative Example 7 | Aluminum hollow core metal | Conventional polyimide represented by formula (12) | Not used | ← | Electrostatic coating → firing | 223 | 210,000 |

TABLE 6-continued

| | | | adhesive Primer | | | | |
|---|---|---|---|---|---|---|---|
| | Supporting Substrate | Polyimide | Reactive group of silane coupling agent Upper: metal side (—OR) Lower: resin side (—X) | Method for using silane coupling agent | Coating method of fluororesin layer | Peeling strength after 200,000 sheets fed [g/cm] | Number of sheets fed |
| Comparative Example 8 | ↑ | ↑ | Methoxy group Vinyl group | Integral blend method | ↑ | 250 | 270,000 |
| Comparative Example 9 | ↑ | ↑ | Not used | ← | Tube | 234 | 220,000 |
| Comparative Example 10 | ↑ | ↑ | Methoxy group Vinyl group | Integral blend method | ↑ | 268 | 260,000 |
| Comparative Example 11 | Polyimide belt containing filler | ↑ | Not used | ← | Electrostatic coating → firing | 250 | 230,000 |
| Comparative Example 12 | ↑ | ↑ | Methoxy group Vinyl group | Integral blend method | ↑ | 257 | 220,000 |

Comparative Example 8

The production and evaluation of the heat roll 1 were conducted in the same manner as in Comparative Example 7 except that the primer solution used had a vinyl-based silane coupling agent "KBM1003" (manufactured by Shin-Etsu Chemical Co., Ltd.) blended into it in a concentration of 5% by weight by an integral blend method. The measurement results of the peeling strength are shown in Table 6. In the paper-feeding endurance test, peeling occurred not only between the hollow core metal and the primer layer but also between the fluororesin layer and the primer layer when the number of sheets fed exceeded 270,000.

Comparative Example 9

The production and evaluation of the heat roll 1 were conducted in the same manner as in Comparative Example 7 except that a PFA tube was fused by being heated and shrunk in the formation of the fluororesin layer. The measurement results of the peeling strength are shown in Table 6. In the paper-feeding endurance test, peeling occurred not only between the hollow core metal and the primer layer but also between the fluororesin layer and the primer layer when the number of sheets fed exceeded 220,000.

Comparative Example 10

The production and evaluation of the heat roll 1 were conducted in the same manner as in Comparative Example 9 except that the premier solution used contained a vinyl-based silane coupling agent "KBM1003" (manufactured by Shin-Etsu Chemical Co., Ltd.) blended into it in a concentration of 5% by weight by an integral blend method. The measurement results of the peeling strength are shown in Table 6. In the paper-feeding endurance test, peeling occurred not only between the hollow core metal and the primer layer but also between the fluororesin layer and the primer layer when the number of sheets fed exceeded 260,000.

Comparative Example 11
(Production of Heat Belt 6 in FIG. 4)

A belt made of a polyimide film having a thickness of 0.2 mm, to which $SiO_2$ fine particles (primary particle size: about 20 nm) had been added in a ratio of 20% by weight as a filler, was used as a substrate. The substrate was not treated with a silane coupling agent, and the same primer solution as that in Comparative Example 7 was applied by spraying and dried at 150° C. for 5 minutes to form a primer layer, then, a PFA powder resin was sprayed uniformly by an electrostatic coating method, and curing treatment and PFA film-forming treatment were conducted under firing conditions of 350° C. for 40 minutes to form a fluororesin layer. After firing, the surface was polished by a polishing film to obtain a heat belt 6. The thickness of the resulting film after drying of the primer solution was 10 to 13 μm, and the whole film thickness after PFA film-forming was 46 to 50 μm.
(Evaluation of Heat Belt 6 in FIG. 4)

The evaluation was conducted in the same manner as in Example 26. The evaluation results of the peeling strength are shown in Table 6. In the paper-feeding endurance test, peeling occurred not only between the belt and the primer layer but also between the fluororesin layer and the primer layer when the number of sheets fed exceeded 230,000.

Comparative Example 12

The production and evaluation of the heat belt 6 were conducted in the same manner as in Comparative Example 11 except that the primer solution used contained a vinyl-based silane coupling agent "KBM1003" (manufactured by Shin-Etsu Chemical Co., Ltd.) blended into it in a concentration of 5% by weight by an integral blend method. The measurement results of the peeling strength are shown in Table 6. In the paper-feeding endurance test, peeling occurred not only between the belt and the primer layer but also between the fluororesin layer and the primer layer when the number of sheets fed exceeded 220,000.

From the above-described results, it has been discovered that in the fixing member of the present invention, the fluororesin layer is not easily peeled from the substrate, and excellent durability is obtained even under severe conditions of use.

What is claimed is:

1. A primer layer for a fluororesin formed from a primer composition which comprises a heat resistant resin, a fluororesin, and a coupling agent, wherein said primer layer is composed of:
a first layer containing as a main component a silane coupling agent; and a second layer containing a fluororesin and a heat resistant resin, wherein the first layer is formed from a first solution applied to a surface of a substrate, and the second layer is formed from a second solution applied onto the first layer after the first solution has been applied and dried, and the coupling agent is represented by the following general formula (I):

$(X)_{4-n}$—Si—$(OR)_n$   General formula (I)

wherein, R represents a methyl group or ethyl group, X represents a monovalent organic group, and n is an integer from 2 to 4.

2. A primer layer for a fluororesin according to claim 1, wherein said heat resistant resin is one or more selected from the group consisting of a polyimide, polyamideimide, polyethersulfone, and polyphenylene sulfide.

3. A primer layer for a fluororesin according to claim 1, wherein said fluororesin of said primer composition is any one of polytetrafluoroethylene, tetrafluoroethylene-perfluoroalkoxyethylene copolymer, or perfluoroalkylvinyl ether-tetrafluoroethylene copolymer.

4. A primer layer for a fluororesin according to claim 1, further comprising an inorganic filler.

5. A primer layer for a fluororesin according to claim 1, wherein said monovalent organic group is selected from the group consisting of a vinyl group, epoxy group, methacryl group, mercapto group, amino group, ethoxy group, and methyl group.

6. A primer layer for a fluororesin according to claim 1, wherein a substrate on which the primer layer is formed is a substrate composed of an inorganic material, or a substrate composed of a heat resistant resin containing an inorganic material as a filler.

7. A primer layer for a fluororesin according to claim 6, wherein the inorganic material is at least one selected from the group consisting of metals, alloys, and ceramics.

8. A primer layer for a fluororesin according to claim 6, wherein the heat resistant resin is at least one selected from the group consisting of polyamide, polyamideimide, polyimide, polyarylene sulfide, and polyether, in which particles of silicon carbide or boron nitride are added, and the inorganic material as a filler is at least one selected from the group consisting of metals and inorganic oxides.

9. A fixing member obtained by forming a fluororesin layer via a primer layer on the surface of a substrate, wherein the primer layer is formed from a primer composition which comprises a heat resistant resin, a fluororesin, and a coupling agent; and the primer layer is composed of a first layer containing as a main component a silane coupling agent and a second layer containing a fluororesin and a heat resistant resin; and the first layer is formed from a first solution applied to a surface of a substrate and the second layer is formed from a second solution applied onto the first layer after the first layer has been applied and dried; and the coupling agent is represented by the following general formula (I):

$(X)_{4-n}$—Si—$(OR)_n$   General formula (I)

wherein, R represents a methyl group or ethyl group, X represents a monovalent organic group, and n is an integer from 2 to 4.

10. A fixing member according to claim 9, wherein said heat resistant resin is one or more selected from the group consisting of a polyimide, polyamideimide, polyethersulfone, and polyphenylene sulfide.

11. A fixing member according to claim 9, wherein said fluororesin of said primer composition is any one of polytetrafluoroethylene, tetrafluoroethylene-perfluoroalkoxyethylene copolymer, or perfluoroalkylvinyl ether-tetrafluoroethylene copolymer.

12. A fixing member according to claim 9, wherein said fluororesin layer is made from the group consisting of one fluororesin selected from perfluoroalkylvinyl ether-tetrafluoroethylene copolymer, polytetrafluoroethylene, hexafluoropropylene-tetrafluoroethylene copolymer, and polyhexafluoropropylene.

13. A fixing member according to claim 9, wherein said fluororesin layer is formed by any method selected from an electrostatic coating method, dispersion method, and tube insertion method.

14. A fixing device for conducting fixation by heating a toner image on a receiving member, wherein a fixing member which contacts with the toner image on the receiving member is a fixing member according to claim 9.

15. A fixing member according to claim 9, wherein said monovalent organic group is selected from the group consisting of a vinyl group, epoxy group, methacryl group, mercapto group, amino group, ethoxy group, and methyl group.

* * * * *